US012769580B2

(12) United States Patent
Odashima et al.

(10) Patent No.: US 12,769,580 B2
(45) Date of Patent: Oct. 20, 2026

(54) CONTROL APPARATUS, CONTROL SYSTEM, CONTROL METHOD, AND PROGRAM

(71) Applicant: TOYOTA JIDOSHA KABUSHIKI KAISHA, Toyota (JP)

(72) Inventors: Tadashi Odashima, Seto Aichi-ken (JP); Yoshiumi Kawamura, Suntou-gun Shizuoka-ken (JP); Kazuki Shibata, Nagakute Aichi-ken (JP); Tomohiko Jimbo, Nagakute Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 547 days.

(21) Appl. No.: 18/454,990

(22) Filed: Aug. 24, 2023

(65) Prior Publication Data

US 2024/0069956 A1 Feb. 29, 2024

(30) Foreign Application Priority Data

Aug. 29, 2022 (JP) ................................ 2022-135849

(51) Int. Cl.
*G06F 9/48* (2006.01)

(52) U.S. Cl.
CPC .................................. *G06F 9/4818* (2013.01)

(58) Field of Classification Search
CPC ..................................................... G06F 9/4818
See application file for complete search history.

(56) References Cited

U.S. PATENT DOCUMENTS 12,050,438 B1 * 7/2024 Ebrahimi Afrouzi ........................ G05B 13/0205
2008/0109114 A1 * 5/2008 Orita ...................... B25J 19/005 901/50
2020/0244707 A1 * 7/2020 Silver .................... G06N 3/045
2020/0282549 A1 * 9/2020 Torii ...................... B25J 9/1661
2021/0097459 A1 4/2021 Ishibashi et al.
2022/0100184 A1 3/2022 Natarajan et al.
2023/0339108 A1 * 10/2023 Cella .................... G05D 1/0297
2023/0347503 A1 * 11/2023 Jurt ........................ B25J 9/0009
2024/0311687 A1 * 9/2024 Nikou ................ H04L 41/0823

FOREIGN PATENT DOCUMENTS

JP 2017094122 A 6/2017
JP 2021-051649 A 4/2021
WO 2014194191 A1 12/2014
WO 2019/058694 A1 3/2019
WO 2022/152404 A1 7/2022

* cited by examiner

*Primary Examiner* — Bradley A Teets
*Assistant Examiner* — Peter Li Yuan
(74) *Attorney, Agent, or Firm* — Dinsmore & Shohl LLP

(57) ABSTRACT

A request response processing unit calculates, based on observation information about the agent, at least one other agent near the agent, and the task, a request parameter as to whether or not to request help, and a response parameter as to whether or not to respond to a request from the at least one other agent. An importance processing unit performs processing for calculating, based on at least the request parameter of the at least one other agent and the response parameter of the agent, importance of each of the tasks for the agent. A task selection unit selects the task to be performed by the agent according to the importance. A task execution unit controls the agent so that it performs the selected task.

7 Claims, 6 Drawing Sheets

CONTROL APPARATUS, CONTROL SYSTEM, CONTROL METHOD, AND PROGRAM

CROSS REFERENCE TO RELATED APPLICATIONS

This application is based upon and claims the benefit of priority from Japanese patent application No. 2022-135849, filed on Aug. 29, 2022, the disclosure of which is incorporated herein in its entirety by reference.

BACKGROUND

The present disclosure relates to a control apparatus, a control system, a control method, and a program.

There is a technology for making a plurality of agents (such as robots) perform tasks. In connection with this technology, Japanese Unexamined Patent Application Publication No. 2017-094122 discloses a mobile agent capable of assembling a general-purpose structure. In Japanese Unexamined Patent Application Publication No. 2017-094122, a plurality of mobile agents automatically manipulate components such as blocks on a work surface in order to perform actions such as assembling a general-purpose structure. Further, in some cases, various mobile agents operate in cooperation with each other.

SUMMARY

In an environment in which tasks are not yet known, it may not be possible to determine the appropriate number of agents that are required to perform the tasks. In such a case, with the technology disclosed in Japanese Unexamined Patent Application Publication No. 2017-094122, there is a possibility that when a plurality of agents need to perform tasks in cooperation with each other, they cannot proceed with the tasks. Therefore, with the technology disclosed in Japanese Unexamined Patent Application Publication No. 2017-094122, it may be impossible to efficiently achieve the target for the tasks.

The present disclosure provides a control apparatus, a control system, a control method, and a program capable of making it possible to, even in an environment in which tasks are not yet known, efficiently achieve the target for the tasks.

A control apparatus according to the present disclosure is a control apparatus configured to control an agent configured to perform a task, in which the larger the number of agents that perform the task is, the greater a possibility that a target for the task will be achieved increases; and there are a plurality of tasks in an environment, and the control apparatus includes: a request response processing unit configured to calculate, based on observation information about the agent, at least one other agent near the agent, and the task, a request parameter as to whether or not to request help, and a response parameter as to whether or not to respond to a request from the at least one other agent; an importance processing unit configured to perform processing for calculating, based on at least the request parameter of the at least one other agent and the response parameter of the agent, importance of each of the tasks for the agent; a task selection unit configured to select the task to be performed by the agent according to the importance; and a task execution unit configured to control the agent so that it performs the selected task.

Further, a control system according to the present disclosure is a control system configured to control a plurality of agents in a distributed manner, each of the plurality of agents being configured to perform a task, in which the larger the number of agents that perform the task is, the greater a possibility that a target for the task will be achieved increases; and there are a plurality of tasks in an environment, the control system includes a plurality of control apparatuses, each of the plurality of control apparatus being configured to control a respective one of a plurality of agents, and each of the control apparatuses includes: a request response processing unit configured to calculate, based on observation information about the agent controlled by that control apparatus, at least one other agent near the agent, and the task, a request parameter as to whether or not to request help, and a response parameter as to whether or not to respond to a request from the at least one other agent; an importance processing unit configured to perform processing for calculating, based on at least the request parameter of the at least one other agent and the response parameter of the agent, importance of each of the tasks for the agent; a task selection unit configured to select the task to be performed by the agent according to the importance; and a task execution unit configured to control the agent so that it performs the selected task.

Further, a control method according to the present disclosure is a control method for controlling an agent configured to perform a task, in which the larger the number of agents that perform the task is, the greater a possibility that a target for the task will be achieved increases; and there are a plurality of tasks in an environment, and the control method includes: calculating, based on observation information about the agent, at least one other agent near the agent, and the task, a request parameter as to whether or not to request help, and a response parameter as to whether or not to respond to a request from the at least one other agent; performing processing for calculating, based on at least the request parameter of the at least one other agent and the response parameter of the agent, importance of each of the tasks for the agent; selecting the task to be performed by the agent according to the importance; and controlling the agent so that it performs the selected task.

Further, a program according to the present disclosure is a program for implementing a control method for controlling an agent configured to perform a task, in which the larger the number of agents that perform the task is, the greater a possibility that a target for the task will be achieved increases; and there are a plurality of tasks in an environment, and the program is configured to cause a computer to perform: a step of calculating, based on observation information about the agent, at least one other agent near the agent, and the task, a request parameter as to whether or not to request help, and a response parameter as to whether or not to respond to a request from the at least one other agent; a step of performing processing for calculating, based on at least the request parameter of the at least one other agent and the response parameter of the agent, importance of each of the tasks for the agent; a step of selecting the task to be performed by the agent according to the importance; and a step of controlling the agent so that it performs the selected task.

According to the present disclosure, it is possible to, even in an environment in which tasks are not yet known, efficiently achieve the target for the tasks.

Further, a plurality of policies may be learned for the plurality of agents, respectively, and the request response processing unit may calculate the request parameter and the response parameter based on a respective one of the plurality of policies.

In the present disclosure, owing to the above-described configuration, it is possible to appropriately select a task to be performed for each agent.

Further, the request response processing unit may calculate the request parameter and the response parameter based on a request level and a response level, respectively, the request level and the response level being output from the policy by inputting the observation information into the policy.

In the present disclosure, owing to the above-described configuration, it is possible to appropriately select a task to be performed for each agent.

Further, the request response processing unit may calculate the request parameter indicating that help should be requested when the request level exceeds a predetermined threshold and the task that the agent is performing or about to perform is not proceeding.

In the present disclosure, owing to the above-described configuration, it is possible to appropriately calculate a request parameter indicating that help should be requested when it is necessary to request help for a task that the agent is performing or about to perform.

Further, the request response processing unit may calculate the response parameter indicating that the request should be responded to when the response level exceeds a predetermined threshold and the task that the agent is performing or about to perform is not proceeding.

In the present disclosure, owing to the above-described configuration, it is possible to let the agent continue to perform a task that the agent is performing or about to perform when the task is proceeding.

Further, a plurality of policies may be learned for the plurality of agents, respectively, and the importance processing unit may calculate importance of each of the tasks for the agent based on the policy that has been learned for that agent.

In the present disclosure, owing to the above-described configuration, it is possible to appropriately calculate, for each agent, importance of each of tasks for the agent.

Further, the importance processing unit may calculate, based on a target value of importance of the task corresponding to the observation information, the importance of the task corresponding to the observation information for the agent, the target value of the importance being output from the policy by inputting the observation information into the policy.

In the present disclosure, owing to the above-described configuration, it is possible to calculate, for each agent, the importance of a task corresponding to observation information so that the importance of the task gets closer to its target value. As a result, it is possible to appropriately calculate the importance of a task.

According to the present disclosure, it is possible to provide a control apparatus, a control system, a control method, and a program capable of making it possible to, even in an environment in which tasks are not yet known, efficiently achieve the target for the tasks.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Embodiments according to the present disclosure will be described hereinafter with reference to the drawings. For clarifying the following description, parts of the description and drawings have been omitted and simplified as appropriate. Further, components corresponding to or the same as each other are assigned the same or corresponding numerical numbers (or symbols) throughout the drawings, and redundant descriptions thereof are omitted as appropriate.

Figure 1:
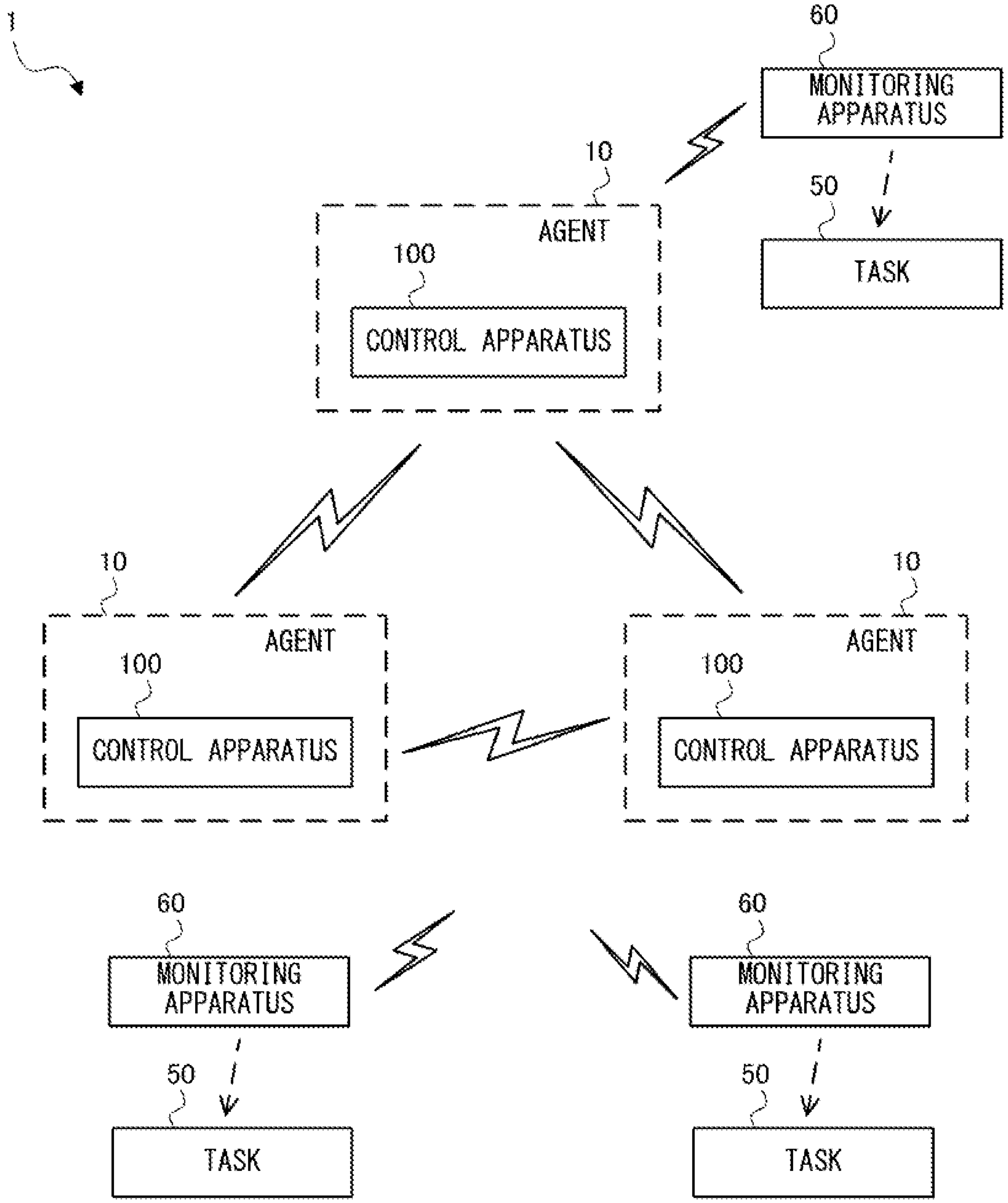
FIG. 1 shows a control system according to a first embodiment.

FIG. 1 shows a control system 1 according to a first embodiment. The control system 1 includes a plurality of control apparatuses 100 each of which controls a respective one of a plurality of agents 10, and a plurality of monitoring apparatuses 60 each of which monitors a respective one of a plurality of tasks 50. Each of the agents 10 is, for example, a machine such as a robot, but is not limited thereto. Each agent 10 is disposed in an environment and autonomously operates in the environment under the control of the control apparatus 100.

The control apparatus 100 is, for example, a computer. The control apparatus 100 may be integrated into the agent 10, which is a machine such as a robot. The control apparatus 100 controls the corresponding agent 10 so that it performs a task 50. That is, the control system 1 controls a plurality of agents 10 in a distributed manner. Each control apparatus 100 is connected to the other control apparatuses 100 through a wired or wireless network so that they can communicate with each other. Further, each control apparatus 100 is also connected to the monitoring apparatuses 60 through a wired or wireless network so that they can communicate with each other. Details of the control apparatus 100 will be described later.

There are a plurality of tasks 50 in the environment in which the agents 10 are present. Each of the agents 10 performs a respective one of the plurality of tasks 50. A target (a goal; an end condition) is set for each task 50. As each agent 10 performs the respective task 50, the task 50 proceeds. Further, as the target for each task 50 is achieved, the task 50 is implemented (completed).

Note that the larger the number of agents 10 that perform a task 50 is, the greater the feasibility of the task 50 being carried out (the possibility that the target for the task 50 will be achieved) may increase. That is, when one agent 10 tries to perform one task 50 but that task 50 does not proceed, a plurality of agents 10 perform that task 50, so that that task 50 may proceed. Therefore, the possibility that that task 50 can be carried out (the possibility that the target for that task 50 will be achieved) may increase. That is, as a plurality of agents 10 perform the task 50 in cooperation with each other, the feasibility of the task 50 being carried out may increase. In other words, as a plurality of agents 10 perform the task 50 in cooperation with each other, the possibility of the target for the task 50 being achieved may increase. However, the number of agents 10 required to carry out a task 50 does not necessarily have to be known in advance. The number of agents 10 required to carry out a task 50 may be found out as the agent 10 performs the task 50. The control apparatus 100 controls the agent 10 so that it performs the task 50 so that the target for the task 50 is achieved. Details of this feature will be described later.

Each of the monitoring apparatuses 60 is, for example, a sensor or a camera. The monitoring apparatus 60 monitors (detects) the state of the respective task 50. Specifically, the monitoring apparatus 60 detects, for example, the position and speed of the task 50. Further, the monitoring apparatus 60 stores information about whether or not the task has been completed. Further, the monitoring apparatus 60 may store information about the target for the task 50. The monitoring apparatus 60 may monitor whether or not the target for the task 50 has been achieved. Note that one monitoring apparatus 60 may be provided (e.g., assigned) for each task 50. Alternatively, one monitoring apparatus 60 may monitor a plurality of tasks 50. Note that each agent 10 may detect the state of the respective task 50. In this case, the monitoring apparatus 60 is not indispensable. Further, the agent 10 may detect the state of the task 50 and determine whether the task 50 has been completed.

Note that in the first embodiment, the task 50 is a package to be conveyed. Further, a goal (a target), which is the destination of the package, is set for each task 50. The agent 10 conveys the package (the task 50) so that the package (the task 50) reaches the goal. Then, the larger the number of agents 10 that convey a package (a task 50) is, the more the possibility that the package (the task 50) will reach the goal increases. That is, depending on the package, it can be so large that a small number of agents 10 cannot convey it. That is, the sizes and weights of packages may be different from one package to another. However, a large number of agents 10 can move such a large package by conveying it by cooperating with each other. That is, a large number of agents 10 can convey the package (proceed with the task 50) by cooperating with each other, and convey the package to its target position (achieve the target for the task 50). Note that the number of agents 10 required to convey the package is not yet known. It is not until the agent(s) 10 try to convey the package that the number of agents 10 required to convey it is known.

Figure 2:
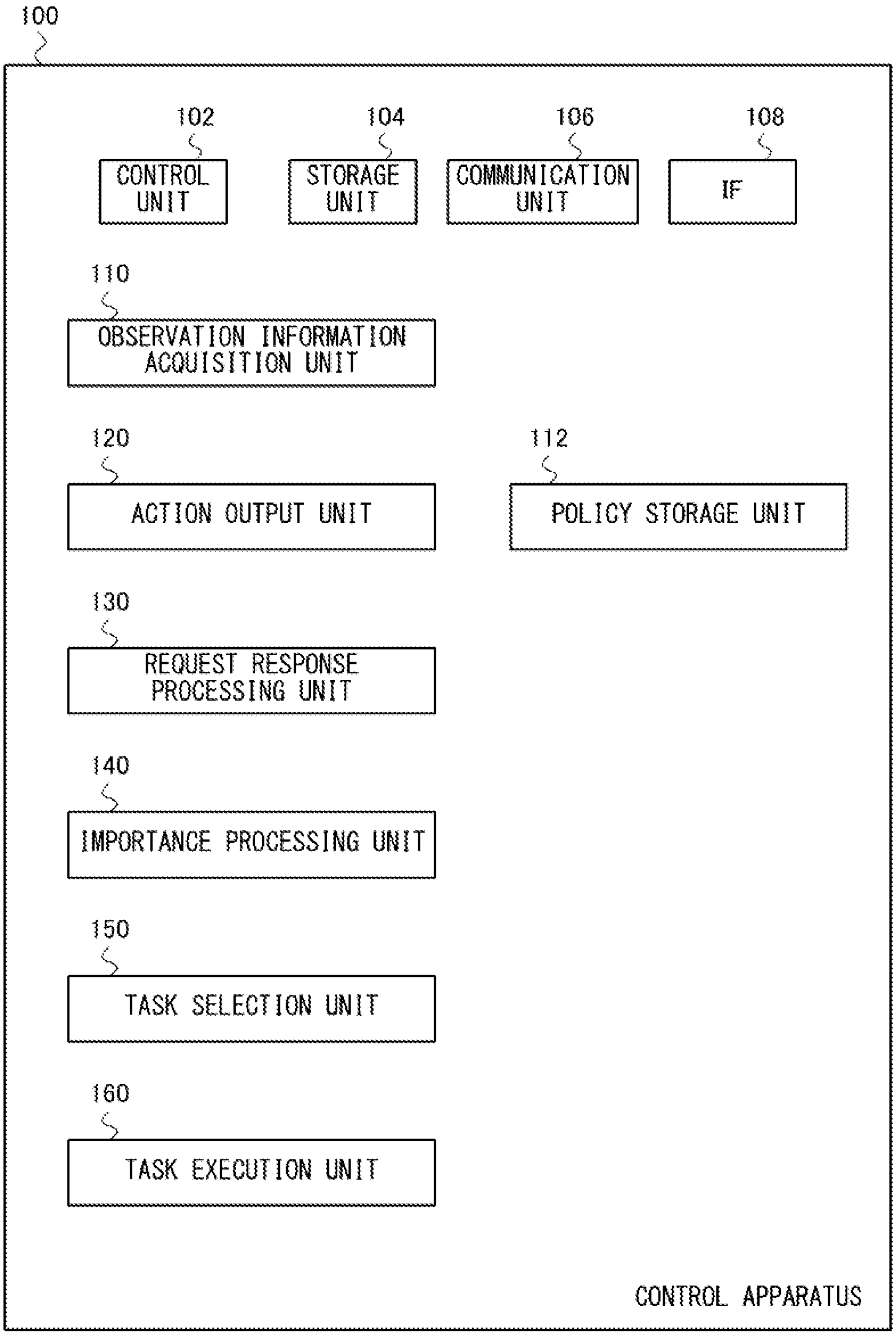
FIG. 2 shows a configuration of a control apparatus according to the first embodiment.

FIG. 2 shows a configuration of the control apparatus 100 according to the first embodiment. As shown in FIG. 2, the control apparatus 100 includes, as main hardware components, a control unit 102, a storage unit 104, a communication unit 106, and an interface unit 108 (IF; Interface). The control unit 102, the storage unit 104, the communication unit 106, and the interface unit 108 are connected to each other through a data bus or the like. Note that the agent 10, which is a machine, may also have a hardware configuration equivalent to that of the control apparatus 100 shown in FIG. 2. Further, the monitoring apparatus 60 may also have a hardware configuration equivalent to that of the control apparatus 100 shown in FIG. 2.

The control unit 102 is, for example, a processor such as a CPU (Central Processing Unit). The control unit 102 has a function as an arithmetic unit that performs control processing, arithmetic processing and the like. Note that the control unit 102 may include a plurality of processors. The storage unit 104 is, for example, a storage device such as a memory or a hard disk drive. The storage unit 104 is, for example, a ROM (Read Only Memory), a RAM (Random Access Memory) or the like. The storage unit 104 has a function of storing a control program, an arithmetic program and the like which are executed by the control unit 102. That is, the storage unit 104 (the memory) stores at least one instruction. Further, the storage unit 104 has a function of temporarily storing processing data and the like. The storage unit 104 may include a database. Further, the storage unit 104 may include a plurality of memories.

The communication unit 106 performs processing necessary for communicating with other apparatuses such as other control apparatuses 100 or the monitoring apparatuses 60 through a network. The communication unit 106 may include a communication port, a router, a firewall, and the like. The interface unit 108 is, for example, a user interface (UI). The interface unit 108 includes an input device such as a keyboard, a touch panel, a mouse or the like, and an output device such as a display, a speaker or the like. The interface unit 108 may be formed as an integrated device in which an input device and an output device are integrated, such as a touch screen (a touch panel). The interface unit 108 receives an operation for inputting data performed by a user (an operator), and outputs information to the user.

The control apparatus 100 according to the first embodiment includes, as its components, an observation information acquisition unit 110, a policy storage unit 112, an action output unit 120, a request response processing unit 130, an importance processing unit 140, a task selection unit 150, and a task execution unit 160. Each of the above-described components can be implemented by, for example, executing a program under the control of the control unit 102. More specifically, each component can be implemented by having the control unit 102 execute a program (instructions) stored in the storage unit 104. Further, each component may be implemented by recording a necessary program in an arbitrary non-volatile recording medium and installing the program as required. Further, each component is not limited to one that is implemented by software using a program. That is, each component may be implemented by any combination or the like of hardware, firmware, and software. Further, each component may be implemented, for example, by using a user-programmable integrated circuit such as an FPGA (Field-Programmable Gate Array) or a microcomputer. In this case, a program composed of the above-described components may be implemented by using this integrated circuit. The above-described matters apply to other embodiments described later.

Note that in the following description, the control apparatus 100 of which the description is given is referred to as the "own control apparatus 100 (the control apparatus of interest)". Further, control apparatuses 100 other than the own control apparatus 100 are referred to as "other control apparatuses 100". Further, the agent 10 controlled by the own control apparatus 100 is referred to as the "own agent (the agent of interest)". Further, agents 10 other than the own agent 10 are referred to as "other agents". Further, although operations performed by the own control apparatus 100 will be explained in the following description, each of the other control apparatuses 100 also performs similar operations.

The control apparatus 100 controls, by using the above-described components, the own agent 10 so that it performs a task 50 so that the target for the task 50 is achieved. That is, the control apparatus 100 controls the own agent 10 so that it performs the task 50. The control apparatus 100 calculates a request parameter and a response parameter of the own agent 10 based on observation information about the own agent 10, other agents 10 near the own agent 10, and the task 50. Note that the "request parameter" is a parameter as to whether or not to request help from the other agents 10.

Further, the "requesting help" corresponds to a situation where at least one other agent 10 (hereinafter also referred to simply as the "other agent") performs a task 50 in cooperation with the own agent 10. Further, the "response parameter" is a parameter as to whether or not to respond to a request from the other agent 10. Further, the "responding to a request" corresponds to a situation where the own agent 10 performs a task 50 in coordination with the other agent 10.

Further, the control apparatus 100 performs processing for calculating, based on the request parameter of the other agent 10 and the response parameter of the own agent 10, importance of each of tasks 50 for the own agent 10. Note that the "importance" is used to determine which task 50 the agent 10 selects and performs. The higher the importance of a task 50 is, the more the possibility that that task 50 will be selected and performed by the agent 10 increases.

Further, the control apparatus 100 selects, according to the importance, a task 50 that the own agent 10 should perform. The control apparatus 100 controls the own agent 10 so that it performs the selected task 50. Further, the control apparatus 100 repeats the above-described series of processes at each control cycle. The possibility that the importance of a task 50 currently being performed by an agent 10 which has calculated a request parameter indicating that help should be requested will become higher in the other agent 10 which has calculated a response parameter indicating that the request should be responded to increases. Therefore, the possibility that that agent 10 will come to help with the task 50 increases. This feature will be described hereinafter in detail.

The observation information acquisition unit 110 acquires observation information from a surrounding environment. The observation information is information about the own agent 10, other agents 10 near the own agent 10, and the task 50. Therefore, the observation information includes information about the own agent 10. Further, the observation information includes information about other agents 10 near the own agent 10 and the task 50 near the own agent 10.

Figure 3:
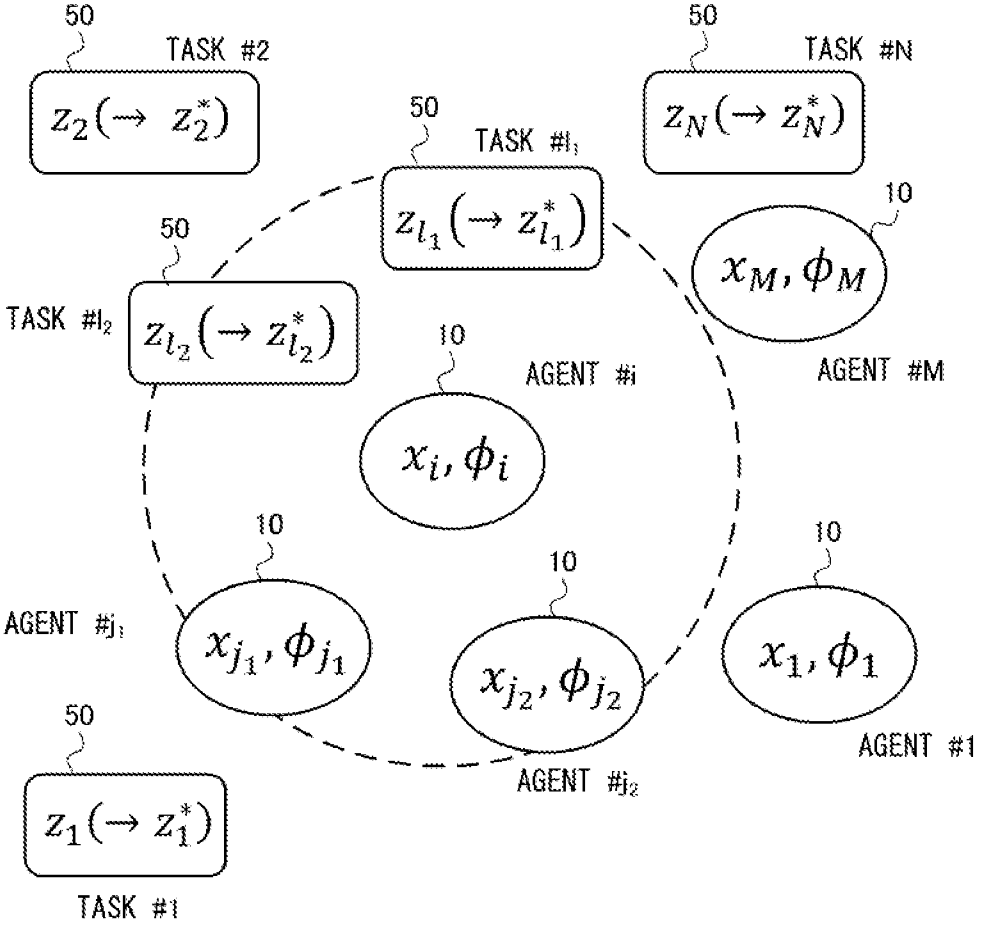
FIG. 3 shows an example of an environment in which there are agents and tasks according to the first embodiment.

FIG. 3 shows an example of an environment in which there are agents 10 and tasks 50 according to the first embodiment. Note that the number of agents 10 is represented by M and the number of tasks 50 is represented by N. Further, the own agent 10 is represented as an "agent #i". The number i is an index indicating the own agent 10. Further, other agents 10 are represented as "agents #j". The number j is an index indicating the other agent 10.

Further, other agents 10 near the agent #i are also referred to as "neighboring agents". The neighboring agents may be, for example, a predetermined number of other agents 10 present within a predetermined range, i.e., within a predetermined distance from the agent #i, (indicated by a circle drawn by a dashed line in FIG. 3). Alternatively, neighboring agents may be a predetermined number of other agents 10 closest to the agent #i. In the first embodiment, the "predetermined number" is two. These two neighboring agents are referred to as agents $\#j_1$ and $\#j_2$, respectively. Further, agents #l and #M, which are agents 10 other than the neighboring agents, also shown in FIG. 3. Note that, in practice, there are also (M−3) agents 10 other than the neighboring agents. That is, the number of agents 10 other than the neighboring agents is obtained by subtracting the number of the own agent 10 (i.e., one) and the number of the neighboring agents (i.e., two) from the total number M of agents 10.

Further, the index of the tasks 50 is represented by l ($l \in \{1, \ldots, N\}$) (i.e., 1 is a member of a set $\{1, \ldots, N\}$). Tasks 50 near the agent #i are referred to as "neighboring tasks". The neighboring tasks may be, for example, a predetermined number of tasks 50 within a predetermined range, i.e., within a predetermined distance from the agent #i, (indicated by the circle drawn by the dashed line in FIG. 3). Note that this "predetermined range" may be a range different from the above-described predetermined range for defining neighboring agents. Alternatively, the neighboring tasks may be a predetermined number of tasks 50 closest to the agent #i. In the first embodiment, the "predetermined number" is two. These two neighboring tasks are referred to as tasks $\#l_1$ and $\#l_2$, respectively. Further, tasks #1, #2 and #N, which are tasks 50 other than the neighboring tasks, are also shown in FIG. 3. Note that, in practice, there are also (N−2) tasks 50 other than the neighboring tasks. That is, the number of tasks 50 other than the neighboring tasks is obtained by subtracting the number of the neighboring tasks (i.e., two) from the total number N of tasks 50.

Further, x indicates the position (the current position) of an agent 10. A position $x_i$ indicates the position of an agent $\#_i$. A position $x_j$ indicates the position of an agent $\#_j$. Further, z indicates the position (the current position) of a task 50. The position z* indicates the target position (the goal) of the task 50. The position $z_1$ indicates the position of the task #l. The position $z_1$* indicates the target position of the task #l. Note that the "position" of a task 50 is not limited to indicating where in the real space the task 50 is located, but may also indicate the state of the task 50. In this case, the "position" of the task 50 may indicate a point in a virtual space representing the state of the task 50. For example, the state of the task 50 may indicate the progress of the task 50, and the "position" of the task 50 may indicate a point in a virtual space representing the progress of the task 50.

Further, for each task 50 for each agent 10, φ indicates the importance of that task 50. For each task 50 for the agent #i, $\varphi_i$ indicates the importance of that task 50. For each task 50 for the agent #j, $\varphi_j$ indicates the importance of that task 50. Note that φ has a number of components corresponding to the number N of tasks 50, and indicates the importance of each of tasks #1, . . . , #l, . . . , and #N. For example, importance $\varphi_i^l$ indicates importance of the task #l for the agent #i. The importance for each agent 10 is calculated in the control apparatus 100 of that agent 10 and transmitted (broadcasted) to nearby agents 10 (control apparatuses 100). Details of this feature will be described later.

The observation information acquisition unit 110 acquires the positions of nearby agents 10 and nearby tasks 50. Specifically, the observation information acquisition unit 110 acquires, from other control apparatuses 100 for nearby agents 10, information about these agents 10. The information about an agent 10 indicates, for example, the position of the agent 10 and the importance of each task 50 for the agent 10 (the importance of each task 50 to the agent 10). Further, the observation information acquisition unit 110 acquires information about each task 50 from the monitoring apparatus 60. The information about a task 50 indicates, for example, the state of the task 50 and the target for the task 50. The state of the task 50 may include, for example, the position and speed of the task 50.

The observation information acquisition unit 110 calculates a distance $D_{ij}$ between the agents #i and #j from the acquired position of the agent #j. Note that $D_{ij}=\|x_i-x_j\|_2$. Further, the observation information acquisition unit 110 calculates a distance between the own agent 10 (the agent #i) and each task #l from the acquired positions of the tasks 50. Specifically, the observation information acquisition unit 110 calculates a distance $D_{il}$ between the agent #i and the task #l by using the below-shown Expression (1):

[Expression 1]

$$D_{il} = \begin{cases} \|x_i - z_l\|_2 & \text{if } \|z_l^* - z_l\|_2 > 0.05 \\ 1.0e4 & \text{otherwise} \end{cases} \tag{1}$$

In Expression (1), "0.05" is a threshold for determining whether or not the task #l has reached its target position (i.e., whether or not the target for the task #l has been achieved). When the distance between $z_1$ and $z_1$* is equal to or shorter than 0.05, the task #l is considered to have reached its target position. Further, "1.0e4" is a value that is so large that the task #l is not considered to be located near the agent #i. That is, from Expression (1), for the task 50 which has reached its target position, $D_{il}$ is calculated to a distance much larger than the actual distance. Therefore, the task 50 which has reached its target position can be ignored in the subsequent processes.

The observation information acquisition unit 110 acquires observation information $o_i$ about the own agent 10 (the agent #i) by using $D_{ij}$ and $D_{il}$. The observation information acquisition unit 110 determines a predetermined number of neighboring agents by using $D_{ij}$ and incorporates information about the neighboring agents into the observation information $o_i$. Further, the observation information acquisition unit 110 determines a predetermined number of neighboring tasks by using $D_{il}$ and incorporates information about the neighboring tasks into the observation information $o_i$.

Neighboring tasks in the first embodiment will be described hereinafter. The condition for the neighboring tasks for the agent #i is represented by the below-shown Expression (2). Note that as shown by Expression (2), the number of neighboring tasks for the agent #i is two.

[Expression 2]

$$N_i^{Load} = \{l_i^1, l_i^2\} \tag{2}$$

In the expression, $l_i^l$ represents a neighboring task $\#l_1$ for the agent #i, and is defined by the below-shown Expression (3). That is, the neighboring task $\#l_i^l$ (the neighboring task $\#l_1$) is a task 50 closest to the agent #i. Note that this neighboring task $\#l_1$ can be a task 50 that the agent #i is currently performing.

[Expression 3]

$$l_i^1 = \arg\min_l D_{il} \tag{3}$$

Further, $l_i^2$ represents a neighboring task $\#l_2$ for the agent #i, and is defined by the below-shown Expression (4). That is, the neighboring task $\#l_i^2$ (the neighboring task $\#l_2$) is a task 50 second closest to the agent #i.

[Expression 4]

$$l_i^2 = \arg\min_{l \neq l_i^1} D_{il} \tag{4}$$

The observation information acquisition unit 110 acquires observation information $o_i$ as shown in the below-shown Expression (5). Note that in Expression (5), T at the right shoulder represents a transposition. Further, Expression (5) represents observation information at a certain time point (e.g., a time t).

[Expression 5]

$$o_i = \left[x_i^\top, \phi_i^{l_1}, \phi_i^{l_2}, x_{j_1}^\top, \phi_{j_1}^{l_1}, \phi_{j_1}^{l_2}, x_{j_2}^\top, \phi_{j_2}^{l_1}, \phi_{j_2}^{l_2}, o_{l_1}^{task^\top}, o_{l_2}^{task^\top}\right]^\top \tag{5}$$

Note that regarding Expression (5), the below-shown Expression (6) represents information about the own agent 10 (the agent #i). Note that the terms in Expression (6) represent, from left to right, the position of the agent #i, the importance of a neighboring task $\#l_1$ for the agent #i, and importance of a neighboring task $\#l_2$ for the agent #i.

[Expression 6]

$$\left[x_i^\top, \phi_i^{l_1}, \phi_i^{l_2}\right]^\top \tag{6}$$

Further, in Expression (5), the below-shown Expression (7) represents information about a neighboring agent $\#j_1$. Note that similarly to the neighboring task $\#l_1$, the neighboring agent $\#j_1$ may be one of the other agents 10 closest to the own agent 10 (the agent #i). Note that the terms in Expression (7) represent, from left to right, the position of the neighboring agent $\#j_1$, the importance of a neighboring task $\#l_1$ for the neighboring agent $\#j_1$, and the importance of a neighboring task $\#l_2$ for the neighboring agent $\#j_1$.

[Expression 7]

$$\left[x_{j_1}^\top, \phi_{j_1}^{l_1}, \phi_{j_1}^{l_2}\right]^\top \tag{7}$$

Further, regarding Expression (5), the below-shown Expression (8) represents information about a neighboring agent $\#j_2$. Note that similarly to the neighboring task $\#l_2$, the neighboring agent $\#j_2$ may be one of other agents 10 second closest to the own agent 10 (the agent #i). Note that the terms in Expression (8) represent, from left to right, the position of the neighboring agent $\#j_2$, the importance of a neighboring task $\#l_1$ for the neighboring agent $\#j_2$, and importance of a neighboring task $\#l_2$ for the neighboring agent $\#j_2$.

[Expression 8]

$$\left[x_{j_2}^\top, \phi_{j_2}^{l_1}, \phi_{j_2}^{l_2}\right]^\top \tag{8}$$

Further, in Expression (5), the second term "o_($l_1$)^task" from the right represents information about the neighboring task $\#l_1$. The term "o_($l_1$)^task" may indicate the state and target of the neighboring task $\#l_1$. As described above, a task 50 is a package to be conveyed in the first embodiment. In this case, the term "o_($l_1$)^task" can be defined by the below-shown Expression (9). Note that the terms on the right side of Expression 9 represent, from left to right, the position of the neighboring task $\#l_1$, the speed of the neighboring task $\#l_1$, and the target position (the goal, i.e., the destination) of the neighboring task $\#l_1$. The position and speed of the neighboring task $\#l_1$ correspond to the state of the neighboring task. Note that the speed of the neighboring task can be calculated from the difference between two or more positions of the neighboring task obtained at the control cycle. The same applies to the speeds of other objects described later.

[Expression 9]

$$o_{l_1}^{task} = \left[z_{l_1}^\top, v_{l_1}^\top, z_{l_1}^{*\top}\right]^\top \quad (9)$$

Similarly, in Expression (5), the first term "o_($l_2$)^task" from the right represents information about the neighboring task #$l_2$. The term "o_($l_2$)^task" may indicate the state and target of the neighboring task #$l_2$. Further, in the first embodiment, the term "o_($l_2$)^task" can be defined by the below-shown Expression (10). Note that the terms on the right side of Expression 10 represent, from left to right, the position of the neighboring task #$l_2$, the speed of the neighboring task #$l_2$, and the target position (the goal, i.e., the destination) of the neighboring task #$l_2$. The position and speed of the neighboring task #$l_2$ correspond to the state of the neighboring task.

[Expression 10]

$$o_{l_2}^{task} = \left[z_{l_2}^\top, v_{l_2}^\top, z_{l_2}^{*\top}\right]^\top \quad (10)$$

From Expressions (5), (9) and (10), the observation information $o_i$ is expressed by the below-shown Expression (11) in the first embodiment in which the task is a package to be conveyed.

[Expression 11]

$$o_i = \left[x_i^\top, \phi_i^{l_1}, \phi_i^{l_2}, x_{j_1}^\top, \phi_{j_1}^{l_1}, \phi_{j_1}^{l_2}, x_{j_2}^\top, \phi_{j_2}^{l_1}, \phi_{j_2}^{l_2}, z_{l_1}^\top, v_{l_1}^\top, z_{l_1}^{*\top}, z_{l_2}^\top, v_{l_2}^\top, z_{l_2}^{*\top}\right]^\top \quad (11)$$

The policy storage unit 112 stores a policy π that has already been learned through reinforcement learning (i.e., a trained model, a learned model, or a learning model). The policy π is learned for each agent 10. Therefore, the learned policy π (parameters of a network (such as a neural network) constituting the policy π) can be different from one agent 10 to another.

The policy $\pi_{NN,i}$ of the agent #i receives the above-described observation information $o_i$ as an input and outputs an action $a_i$ represented by the below-shown Expression (12) (i.e., an action $a_i$ is output based on the policy $\pi_{NN,i}$). Therefore, the action $a_i$ is the output value of the policy $\pi_{NN,i}$.

[Expression 12]

$$a_i = \begin{bmatrix} c_i^{l_1} \\ c_i^{l_2} \\ a_i^d \\ a_i^\sigma \end{bmatrix} = \pi_{NN,i}(o_i) \quad (12)$$

Note that $c_i^l$ is the target value of the importance $\varphi_i^l$ of the neighboring task #l for the agent #i and corresponds to an indicator (an intention) indicating how much importance the agent #i puts on the neighboring task #l. Note that the importance $\varphi_i^l$ can have a value up to the target value $c_i^l$. In other words, the importance $\varphi_i^l$ can be as large as the target value $c_i^l$. The first component $c_i$^($l_1$) in the first right part (i.e., the second formula from the left) of Expression (12) is the target value of the importance of the neighboring task #$l_1$ for the agent #i. Similarly, the second component $c_i$^($l_2$) of the first right part of Expression (12) is the target value of the importance of the neighboring task #$l_2$ for the agent #i.

Further, the third component $a_i^d$ of the first right part of Expression (12) represents a request level of the agent #i. Further, the fourth component $a_i^\sigma$ of the first right part of Expression (12) represents a response level of the agent #i. Note that as shown in the below-shown Expression (13), the range of values that $a_i^d$ and $a_i^\sigma$ can take is from 0 to 1 inclusive.

[Expression 13]

$$0 \le a_i^d, a_i^\sigma \le 1 \quad (13)$$

The request level $a_i^d$ indicates the level (e.g., the necessity) of the request for help made by the agent #i. That is, the higher the value of $a_i^d$ is, the more the possibility that at least one other agent 10 (hereinafter also referred to simply as the "other agent 10") will perform the task 50 in cooperation with the own agent 10 increases. In other words, the higher the value of $a_i^d$ is, the more the possibility that a request parameter indicating that help should be requested from the other agent 10 will be calculated increases.

The response level $a_i^\sigma$ indicates the level (e.g., the necessity) of the response made by the agent #i. That is, the higher the value of $a_i^\sigma$ is, the more the possibility that the own agent 10 will perform the task 50 in cooperation with the other agent 10 increases. In other words, the higher the value of $a_i^\sigma$ is, the more the possibility that a response parameter indicating that the request from the other agent 10 should be responded to will be calculated increases.

Further, the policy $\pi_{NN,i}$ has been learned so as to maximize a reward $r_i(t)$ represented by the below-shown Expression (14). That is, at the learning stage, the policy $\pi_{NN,i}$ receives observation information $o_i$ as an input and outputs an action $a_i$ (i.e., an action $a_i$ is output based on the policy $\pi_{NN,i}$). Then, when the action $a_i$ is output, the reward $r_i(t)$ is calculated. Then, parameters (weights) in the network in the policy $\pi_{NN,i}$ are updated as required so that its reward (cumulative reward) increases. Note that as can be understood from the fact that there is no index i on the right side of Expression (14), the reward is common to all the agents. Then, from the obtained common reward, the networks of the agents, which have different Q values from one agent to another, and the network of the policy are updated as required. In this way, the policy $\pi_{NN,i}$ is learned.

[Expression 14]

$$r_i(t) = \sum_{l=1}^{N} P_l(t) + \lambda \sum_{l=1}^{N} Q_l(t) \quad (14)$$

The variable t represents a time. Further, $P_l(t)$ represents the achievement level of the task #l at the time t. Therefore, the first term on the right side of Expression (14) represents the summation of achievement levels $P_l(t)$ of the tasks #l (#l, . . . , #N) at the time t. Note that the achievement level of the task 50 may indicate the achievement level for the target for the task 50. Alternatively, the achievement level of the task 50 may indicate whether or not the target for the task 50 has been achieved.

Further, the term $Q_l(t)$ represents the progress of the task #l at the time t. Therefore, the second term on the right side of Expression (14) represents the summation of progresses $Q_l(t)$ of the tasks #l (#l, . . . , #N) at the time t. $\lambda$ is a predetermined coefficient. Note that the progress of a task 50 indicates how far the task 50 has proceeded. That is, the progress of a task 50 indicates the progress of the task 50. Therefore, the more a task 50 has proceeded, the higher its progress may become. Conversely, the more a task 50 has been delayed, the lower its progress may become.

Note that as described above, the task 50 is a package to be conveyed in the first embodiment. Further, in the first embodiment, the fact that the target for the task 50 is achieved means that the task 50 reaches its target position. Therefore, in the first embodiment, $P_l(t)$ is defined by the below-shown Expression (15). Expression (15) shows that when the task #l, which is a package, has already reached the target position at the time t, $P_l(t)$ is equal to one ($P_l(t)=1$), and when not so, $P_l(t)$ is equal to zero ($P_l(t)=0$).

[Expression 15]

$$P_l(t) := \begin{cases} 1 & \text{if } \|z_l^* - z_l(t)\|_2 < 0.05 \\ 0 & \text{otherwise} \end{cases} \tag{15}$$

Further, in the first embodiment, it can be said that when the package is moving fast, the conveyance of the package is proceeding, whereas when the package is not moving fast, the conveyance of the package is delayed. That is, in the first embodiment, the faster the task 50, which is a package, is moving, the higher the progress of the task 50 may become. Therefore, in the first embodiment, $Q_l(t)$ is defined by the below-shown Expression (16). As shown in Expression (16), in the first embodiment, the progress $Q_l(t)$ of a task #l corresponds to the moving speed of the task #l, which is a package. That is, in the first embodiment, the faster the task #l, which is a package, is moving, the higher the progress $Q_l(t)$ may become.

[Expression 16]

$$Q_l(t) := \|v_l(t)\|_2 \tag{16}$$

According to Expression (16), in the first embodiment, the reward $r_i(t)$ represented by the above-shown Expression (14) is represented by the below-shown Expression (17).

[Expression 17]

$$r_i(t) = \sum_{l=1}^{N} P_l(t) + \lambda \sum_{l=1}^{N} \|v_l(t)\|_2 \tag{17}$$

$$P_l(t) := \begin{cases} 1 & \text{if } \|z_l^* - z_l(t)\|_2 < 0.05 \\ 0 & \text{otherwise} \end{cases}$$

The action output unit 120 outputs an action $a_i$ corresponding to the observation information $o_i$ by using the above-described policy $\pi$. Specifically, the action output unit 120 inputs the observation information $o_i$ into the policy $\pi_{NN,i}$. As a result, the policy $\pi_{NN,i}$ outputs an action $a_i$ (i.e., an action $a_i$ is output based on the policy $\pi_{NN,i}$).

The request response processing unit 130 calculates a request parameter and a response parameter for the own agent 10. The request response processing unit 130 calculates a request parameter and a response parameter for the agent #i based on the action $a_i$ output from the policy $\pi_{NN,i}$ by the action output unit 120. It can be said that since the action $a_i$ is output according to the observation information $o_i$, the request response processing unit 130 calculates a request parameter and a response parameter based on the observation information.

The request response processing unit 130 calculates a request parameter $d_i$ for the agent #i based on the request level $a_i^d$ output from the policy $\pi_{NN,i}$ by the action output unit 120. Specifically, the request response processing unit 130 may calculate a request parameter $d_i$ indicating that help should be requested when the request level $a_i^d$ exceeds a predetermined threshold. On the other hand, the request response processing unit 130 may calculate a request parameter $d_i$ indicating that help should not be requested when the request level $a_i^d$ is equal to or lower than the threshold. Alternatively, the request response processing unit 130 may calculate a request parameter $d_i$ indicating that help should be requested when the request level $a_i^d$ exceeds a threshold and the task 50 that the own agent 10 is performing or about to perform is not proceeding. On the other hand, the request response processing unit 130 may calculate a request parameter $d_i$ indicating that help should not be requested when the above-described conditions are not satisfied. The request response processing unit 130 transmits the calculated request parameter $d_i$ to the control apparatus 100 for the other agent 10.

For example, the request response processing unit 130 calculates a request parameter $d_i$ of the agent #i by using the below-shown Expression (18). In the expression, the state $d_i=1$ indicates that the agent #i should request help. The state $d_i=0$ indicates that the agent #i should not request help. Therefore, the request parameter $d_i$ can serves as a trigger for an event in which help is requested.

[Expression 18]

$$d_i = \begin{cases} 1 & \text{if } a_i^d > 0.5 \text{ and } Q_{l_i^*}(t) = 0 \\ 0 & \text{otherwise} \end{cases} \tag{18}$$

In Expression (18), "0.5" is a predetermined threshold. The threshold is not limited to 0.5. Further, $l_i$* represents the currently selected task 50 for the agent #i. In other words, $l_i$* represents the task 50 selected by the task selection unit 150 (which will be described later) at the last control cycle. In still other words, $l_i$* represents the task 50 that the own agent 10 (the agent #i) is performing or about to perform. Further, Q_($l_i$*)(t) represents the progress of the task #$l_i$*. Further, the condition Q_($l_i$*)(t)=0 indicates that the task #$l_i$* is not proceeding.

Therefore, Expression (18) shows that the request parameter becomes one ($d_i=1$) when the request level $a_i^d$ exceeds the threshold "0.5" and the progress of the task #$l_i$* currently-selected for the agent #i is zero (i.e., the task #$l_i$* is not proceeding). In other words, Expression (18) shows that the request parameter $d_i$ indicating that help should be requested is calculated when the request level $a_i^d$ exceeds the threshold "0.5" and the task #$l_i$* currently-selected for the agent #i is not proceeding. Further, Expression (18) shows that the request parameter becomes zero ($d_i=0$) when the above-described conditions are not satisfied. In other words, Expression (18) shows that the request parameter $d_i$ indicating that help should not be requested is calculated when the above-described conditions are not satisfied. Note that in this embodiment, even when a request parameter indicating that help should be requested is calculated, it does not necessarily mean that the other agent #j will actually come to help with the currently selected task $\#l_i$* for the agent #i. Whether or not the other agent #j will actually come to help with the task $\#l_i$* may be determined according to the importance of the task $\#l_i$*. That is, whether or not the other agent #j will actually come to help with the task $\#l_1$* is determined depending on the importance of the task $\#l_1$* which the agent #j is in charge of. In other words, whether or not the other agent #j will actually come to help with the task $\#l_i$* is determined depending on the importance of the task $\#l_i$* for the agent #j.

Note that when the task $\#l_i$* selected for the own agent #i is proceeding, the task $\#l_i$* is proceeding even when the own agent #i does not cooperate with the other agents #j. In such a case, it could be wasteful to request help and perform the task $\#l_i$* in coordination with the other agent #j. Therefore, regarding the above-shown Expression (18), when the progress of the task $\#l_1$* currently-selected for the agent #i is not zero, the request parameter becomes zero ($d_i$=0) even when the request level $a_i^d$ is high. In this way, it is possible to prevent a wasteful request from being made.

Further, the request response processing unit 130 calculates a response parameter $\sigma_i$ for the agent #i based on the response level $a_i^\sigma$ output from the policy $\pi_{NN,i}$ by the action output unit 120. The request response processing unit 130 may calculate a response parameter $\sigma_i$ indicating that the request should be responded to when the response level $a_i^\sigma$ exceeds a predetermined threshold. On the other hand, the request response processing unit 130 may calculate a response parameter $\sigma_i$ indicating that the request should not be responded to when the response level $a_i^\sigma$ is equal to or lower than the threshold. Alternatively, the request response processing unit 130 may calculate a response parameter $\sigma_i$ indicating that the request should be responded to when the response level $a_i^\sigma$ exceeds a threshold and the task 50 that the own agent 10 is performing or about to perform is not proceeding. On the other hand, the request response processing unit 130 may calculate a response parameter $\sigma_i$ indicating that the request should not be responded to when the above-described conditions are not satisfied.

For example, the request response processing unit 130 calculates a response parameter $\sigma_i$ for the agent #i by using the below-shown Expression (19). In the expression, the state $\sigma_i$=1 indicates that the agent #i should respond to the request. The state $\sigma_i$=0 indicates that the agent #i should not respond to the request. Therefore, the response parameter $\sigma_i$ can serves as a trigger for an event in which the request is responded to.

[Expression 19]

$$\sigma_i = \begin{cases} 1 & \text{if } a_i^\sigma > 0.5 \text{ and } Q_{l_i^*}(t) = 0 \\ 0 & \text{otherwise} \end{cases} \tag{19}$$

In Expression (19), "0.5" is a predetermined threshold. The threshold is not limited to 0.5. Further, this threshold does not have to be the same value as the threshold in Expression (18). Further, as described above, $1_i$* indicates the task 50 currently selected for the agent #i. Further, Q_($l_i$*)(t) represents the progress of the task $\#l_i$*. Further, the condition Q_($l_i$*)(t)=0 indicates that the task $\#l_i$* is not proceeding.

Therefore, Expression (19) shows that the response parameter becomes one ($\sigma_i$=1) when the response level $a_i^\sigma$ exceeds the threshold "0.5" and the progress of the task $\#l_i$* currently-selected for the agent #i is zero (i.e., the task $\#l_i$* is not proceeding). In other words, Expression (19) shows that the response parameter $\sigma_i$ indicating that the request should be responded to is calculated when the response level $a_i^\sigma$ exceeds the threshold "0.5" and the task $\#l_i$* currently-selected for the agent #i is not proceeding. Further, Expression (19) shows that the response parameter $\sigma_i$ becomes zero ($\sigma_i$=0) when the above conditions are not satisfied. In other words, Expression (19) shows that the response parameter $\sigma_i$ indicating that the request should not be responded to is calculated when the above-described conditions are not satisfied Note that in this embodiment, even when a response parameter indicating that the request should be responded to is calculated, it does not necessarily mean that the agent #i actually will actually go to help with the task #l for the other agent #j. Whether or not the agent #i will actually go to help with the task #l for the other agent #j may be determined according to the importance of the task #l. That is, whether or not the agent #i will actually go to help with the task #l for the other agent #j is determined depending on the importance of the task #l which the agent #j is in charge of. In other words, whether or not the agent #i will actually go to help with the task #l for the other agent #j is determined depending on the importance of the task #l for the agent #j.

Note that in the case where the task $\#l_i$* selected for the own agent #i is proceeding, if the own agent #i actually goes to help with the task #l for the other agent #j in response to the request therefrom, the agent #i will stop the execution of the task $\#l_i$*. However, it could be wasteful to stop the execution of the task which the agent #i is proceeding with. That is, when the task $\#l_i$* currently-selected for the agent #i (i.e., the task the agent #i is proceeding with) is proceeding, it is desirable to continue performing the task $\#l_i$*. Therefore, regarding the above-shown Expression (19), when the progress of the task $\#l_i$* currently-selected for the agent #i is not zero, the response parameter $\sigma_i$ becomes zero ($\sigma_i$=0) even when the response level $a_i^\sigma$ is high. In this way, it is possible to prevent a wasteful response from being made.

Note that as described above, the task #l is a package to be conveyed in the first embodiment. Further, in the first embodiment, as shown by the above-shown Expression (16), the progress of the task #l corresponds to the moving speed of the task #l, which is a package. Therefore, in the first embodiment, the progress of the task $\#l_1$* is expressed by the below-shown Expression (20).

[Expression 20]

$$Q_{l_i^*}(t) := \|v_{l_i^*}(t)\|_2 \tag{20}$$

Therefore, in the first embodiment, the request parameter $d_i$ expressed by the above-shown Expression (18) is represented by the below-shown Expression (21).

[Expression 21]

$$d_i = \begin{cases} 1 & \text{if } a_i^d > 0.5 \text{ and } \|v_{l_i^*}\|_2 = 0 \\ 0 & \text{otherwise} \end{cases} \tag{21}$$

Further, in the first embodiment, the response parameter $\sigma_i$ expressed by the above-shown Expression (19) is represented by the below-shown Expression (22).

[Expression 22]

$$\sigma_i = \begin{cases} 1 & \text{if } a_i^{\sigma} > 0.5 \text{ and } \|v_{l_i^*}\|_2 = 0 \\ 0 & \text{otherwise} \end{cases} \quad (22)$$

The importance processing unit 140 updates (calculates) the importance of each of the nearby tasks #l ($l \in \{1, \ldots, N\}$) (i.e., l is a member of a set {1, . . . , N}) for the own agent #i. Specifically, the importance processing unit 140 performs processing for calculating, based on the request parameter of the other agent #j and the response parameter of the own agent #i (the agent of interest), the importance of each of the tasks for the own agent #i.

Specifically, the importance processing unit 140 acquires a request parameter $d_j$ for the nearby agent #j from the control apparatus 100 of the agent #j. Further, the importance processing unit 140 acquires, for each task #l for each nearby agent #j, the importance $\varphi_j^l$ of that task from the control apparatus 100 of the agent #j. Note that, as described above, the observation information acquisition unit 110 has already acquired the importance for each of the neighboring tasks $\#l_1$ and $\#l_2$ for the neighboring agent $\#j_1$ and $\#j_2$. In contrast, the importance processing unit 140 acquires, for each task #l for each of not only the neighboring agents but all the nearby agents #j (that the importance processing unit 140 can acquire), the importance $\varphi_j^l$ of that task #l for the agent #j from the control apparatus 100 of the agent #j. Note that when the importance processing unit 140 could not acquire the request parameter $d_j$ and the importance $\varphi_j^l$ from the control apparatus 100 of the nearby agent #j due to some reason such as communication being impossible, it may set both the request parameter $d_j$ and the importance $\varphi_j^l$ to zero ($d_j=0$, $\varphi_j^l=0$) for this agent #j.

Further, the importance processing unit 140 updates the importance $\varphi_i^l$ for the task #l by using the importance $\varphi_i^l$, the importance $\varphi_j^l$, the request parameter $d_j$ for the other agent #j, and the response parameter $\sigma_i$ for the own agent #i. Further, when the task #l is a neighboring task, the importance processing unit 140 also updates the importance $\varphi_i^l$ for the neighboring task #l by using the target value $c_i^l$ of the importance $\varphi_i^l$ for the neighboring task #l for the own agent #i. Note that the importance $\varphi_i^l$ is the importance of the task #l for the own agent #i.

Specifically, the importance processing unit 140 calculates a changing amount (a change amount) of the importance $\varphi_i^l$ of the task #l for the agent #i by using the below-shown Expression (23). Note that in Expression (23), k is a predetermined coefficient. Further, for the sake of expression, the left side of Expression (23) may also be expressed as "$\varphi_i^l$(dot)".

[Expression 23]

$$\dot{\phi}_i^l = \begin{cases} k(c_i^l - \phi_i^l) + \sigma_i \sum_{j \in \{1,\ldots,M\}} d_j k(\phi_j^l - \phi_i^l) & l \in N_i^{Load} \\ \sigma_i \sum_{j \in \{1,\ldots,M\}} d_j k(\phi_j^l - \phi_i^l) & l \notin N_i^{Load} \end{cases} \quad (23)$$

The importance processing unit 140 updates the importance $\varphi_i^l$ of the task #l for the agent #i by adding the changing amount $\varphi_i^l$(dot) of the importance $\varphi_i^l$ represented by Expression (23) to the current importance $\varphi_i^l$. That is, the importance processing unit 140 updates the importance $\varphi_i^l$ of the task #l for the agent #i by the below-shown Expression (24). Note that Δt indicates a control cycle. The importance processing unit 140 updates the importance for each of all the tasks #l. It is assumed that the initial value $\varphi_i^l(0)$ of the importance for each of all the agents #i (i=1, . . . , M) and for each of all the tasks #l (l=1, . . . , N) has been determined in advance.

[Expression 24]

$$\phi_i^l(t + \Delta t) = \phi_i^l(t) + \dot{\phi}_i^l dt \quad (24)$$

When the task #l is not a neighboring task (l does not satisfy the conditions for the neighboring task represented by Expression (2)), the changing amount $\varphi_i^l$(dot) of the importance $\varphi_i^l$ is expressed by the lower part on the right side of Expression (23). The lower part on the right side in Expression (23) corresponds to what is obtained by calculating, for each of the agents #j, the product of the request parameter $d_j$ for the agent #j, the value obtained by subtracting the importance $\varphi_i^l$ from the importance $\varphi_j^l$, and the coefficient k, and then multiplying the summation of these products by the response parameter $\sigma_i$ for the agent #i. Note that the lower part on the right side in Expression (23) becomes zero when the response parameter $\sigma_i$ of the own agent #i is zero. That is, when the task #l is not a neighboring task and the response parameter $\sigma_i$ is zero, the importance $\varphi_i^l$ of the task #l for the own agent #i is not updated (not changed). Further, when the response parameter $\sigma_i$ is one, the summation of differences obtained by subtracting the importance $\varphi_i^l$ from the importance $\varphi_j^l$ for all the agents #j (the requesting agents) of each of which the request parameter is one corresponds to the changing amount $\varphi_i^l$(dot). Therefore, the more there are requesting agents #j of each of which the importance $\varphi_j^l$ is much larger than the importance $\varphi_i^l$, or the more there are requesting agents #j of each of which the importance $\varphi_j^l$ is larger than the importance $\varphi_i^l$, the higher the importance $\varphi_j^l$ of the task #l for the agent #i may become.

On the other hand, when the task #l is a neighboring task (the task #l satisfies the conditions for the neighboring task expressed by Expressions (2) to (4)), the changing amount $\varphi_i^l$(dot) of the importance $\varphi_i^l$ is expressed by the upper part on the right side of the above-shown Expression (23). The upper part on the right side of Expression (23) corresponds to what is obtained by calculating the product of the value obtained by subtracting the importance $\varphi_i^l$ of the task #l for the agent #i from the target value $c_i^l$ thereof and the coefficient k, and then adding the product to the lower part on the right side of Expression (23). Note that the second term of the upper part on the right side of Expression (23) is the same as the lower part on the right side of Expression (23). Therefore, the second term of the upper part on the right side of Expression (23) becomes zero when the response parameter $\sigma_i$ of the own agent #i is zero. That is, when the task #l is a neighboring task and the response parameter $\sigma_i$ is zero, based on the first term of the upper part on the right side of Expression (23), the importance $\varphi_i^l$ of the task #l for the own agent #i can be updated so as to get closer to its target value $c_i^l$. Further, when the response parameter $\sigma_i$ is one, what is obtained by calculating the summation of differences obtained by subtracting the importance $\varphi_i^l$ from the importance $\varphi_j^l$ for all the requesting agents, calculating the product of the value obtained by subtracting the importance $\varphi_i^l$ from the target value $c_i^l$ and the coefficient k, and adding the summation and the product corresponds to the changing amount $\varphi_{i=}^{l}$(dot). Therefore, in the case where the target value $c_i^l$ is large, the more there are requesting agents #j of each of which the importance $\varphi_j^l$ is much larger than the importance $\varphi_i^l$, or the more there are requesting agents #j of each of which the importance $\varphi_j^l$ is larger than the importance $\varphi_i^l$, the higher the importance $\varphi_j^l$ of the task #l for the agent #i may become.

Further, the importance processing unit 140 processes the importance of the task #l for which the target has been achieved. Specifically, the importance processing unit 140 sets the importance $\varphi_i^l$ of the task #l for which the target has been achieved to zero. Note that as described above, in the first embodiment, the fact that the target for the task #l is achieved means that the task #l reaches its target position. Therefore, the importance processing unit 140 sets the importance $\varphi_i^l$ of the task #l which has reached the target position to zero based on the below-shown Expression (25). Note that δ is a threshold for determining whether or not the task #l has reached the target position (i.e., whether or not the target for the task #l has been achieved), and in the example represented by Expression (1) or the like, the threshold is 0.05. In this way, no processing is performed for the task #l for which the target has been achieved, and each of the agents 10 performs other tasks 50.

[Expression 25]

$$\phi_i^l \leftarrow 0, \text{ if } \|z_l^* - z_l\|_2 < \delta \tag{25}$$

Further, the importance processing unit 140 transmits the calculated importance $\varphi_i^l$ of each task #l for the agent #i to the control apparatus 100 of the other agent #j. That is, the importance of each task 50 for each of the agents 10 is shared among the agents 10 (control apparatuses 100). Therefore, the control apparatus 100 of the other agent #j performs the above-described process for its agent #j. That is, the control apparatus 100 of the other agent #j calculates (updates) the importance $\varphi_j^l$ of each task #l for its agent #j.

The task selection unit 150 selects a task $\#l_1$* to be performed by the own agent #i. Specifically, the task selection unit 150 selects, based on the below-shown Expression (26), a task #l of which the importance $\varphi_i^l$ is the largest among those of all the tasks #l (l=1, . . . , N) as the task $\#l_i$* to be performed by the own agent #i. In the first embodiment, since the task 50 is a package to be conveyed, the task selection unit 150 selects a package (a task $\#l_i$*) of which the importance is the largest for the own agent #i.

[Expression 26]

$$l_i^* = \arg\max_l \phi_i^l \tag{26}$$

The task execution unit 160 performs processing so that the own agent #i performs the task #l. Specifically, the task execution unit 160 performs control so that the own agent #i performs the task $\#l_i$* selected by the task selection unit 150. More specifically, the task execution unit 160 acquires the position of the task $\#l_i$* and the target to be achieved (the end condition to be satisfied) thereof. The task execution unit 160 moves the agent #i to the position of the task $\#l_i$*. In this process, the task execution unit 160 may calculate a speed command value for the agent #i. Then, the task execution unit 160 controls the agent #i so that it performs the task $\#l_i$*, and thereby to achieve the target for the task $\#l_i$*. In the case where the task #l is a package, the task execution unit 160 controls an arm(s) of the agent #i so as to grasp the package. In this process, the task execution unit 160 may calculate a force and torque command value for the tip of the arm (an end effector or the like.). The task execution unit 160 controls the agent #i so as to convey the task $\#l_i$* to the target position of the task $\#l_i$*.

Note that when the request parameter $d_i$ of the own agent #i is zero, $d_j k(\varphi_j^l - \varphi_i^l)$ in the second term of the upper part on the right side of Expression (23), which is the same as the lower part on the right side, becomes zero ($d_j k(\varphi_j^l - \varphi_i^l)=0$) in the process performed in the control apparatus 100 of the other agent #j. However, it should be noted that since it is the process performed in the control apparatus 100 of the other agent #j, the index j corresponds to the own agent #i and the index i corresponds to the other agent #j. Therefore, in the case where the request parameter $d_i$ of the own agent #i is zero, it is unlikely, in the process performed in the control apparatus 100 of the other agent #j, to affect the importance of the task #l for the other agent #j even when the importance of the task #l is high in the own agent #i. Note that the task #l of which the importance is high in the own agent #i may include the task $\#l_i$* selected for the own agent #i. From the above-described fact, when the request parameter $d_i$ is zero, the possibility that the task $\#l_i$* selected for the own agent #i will also be selected in the process performed in the control apparatus 100 of the other agent #j decreases. Therefore, the possibility that the other agent #j will come to help with the task $\#l_i$* decreases.

On the other hand, in the case where the request parameter $d_i$ of the own agent #i is one, the possibility that the significance (the importance) of the task #l of which the importance is high in the own agent #i increases in the process performed in the control apparatus 100 of the other agent #j increases. Therefore, when the request parameter $d_i$ is one, the possibility that the task $\#l_i$* selected for the own agent #i will also be selected in the process performed in the control apparatus 100 of the other agent #j increases. That is, the possibility that the other agent #j will come to help with the task $\#l_i$* increases. Therefore, in the case where the task $\#l_i$* is not proceeding, as the request parameter $d_i$ becomes one, the possibility that the task $\#l_i$* will be performed in cooperation of the own agent #i and the other agent #j increases. As a result, the possibility that the target for the task $\#l_i$* will be achieved increases.

Further, when the response parameter $\sigma_i$ is zero, the second term of the upper part on the right side of Expression (23), which is the same as the lower part on the right side, becomes zero in the process performed in the control apparatus 100 of the own agent #i. Therefore, when the response parameter $\sigma_i$ is zero, the importance of the task #l of which the importance is high in the other agent #j (the requesting agent) is less likely to increase in the process performed in the control apparatus 100 of the own agent #i. Note that the task #l of which the importance is high in the other agent #j may include the task $\#l_j$* selected for the other agent #j. From the above-described fact, when the response parameter $\sigma_i$ is zero, the possibility that the task $\#l_j$* selected for the other agent #j will also be selected in the process performed in the control apparatus 100 of the own agent #i decreases. Therefore, the possibility that the own agent #i will go to help with the task $\#l_j$* decreases.

Note that in this case, based on the first term of the upper part on the right side of Expression (23), the importance $\varphi_i^l$ of the neighboring task #l asymptotically approaches the target value $c_i^l$. Note that the neighboring task #l is the task #$l_i$* that has been selected for the agent #i at the last control cycle and the agent #i is currently performing, and as long as the response parameter a is zero, the possibility that this neighboring task #l will continue to be selected is high.

On the other hand, when the response parameter $\sigma_i$ is one, the second term of the upper part on the right side of Expression (23), which is the same as the lower part on the right side, does not become zero in the process performed in the control apparatus 100 of the own agent #i. That is, when the response parameter $\sigma_i$ is one, the possibility that the importance of the task #l of which the importance is high in the requesting agent #j increases in the process performed in the control apparatus 100 of the own agent #i increases. From the above-described fact, when the response parameter $\sigma_i$ is one, the possibility that the task #$l_j$* selected for the requesting agent #j will also be selected in the process performed in the control apparatus 100 of the own agent #i increases. That is, the possibility that the own agent #i will go to help with the task #$l_j$* increases. Therefore, in the case where the task #$l_j$* selected by the other requesting agent #j is not proceeding, as the response parameter $\sigma_i$ becomes one, the possibility that the task #$l_j$* will be performed in cooperation of the own agent #i and the other agent #j increases. As a result, the possibility that the target for the task #$l_j$* will be achieved increases.

Figure 4:
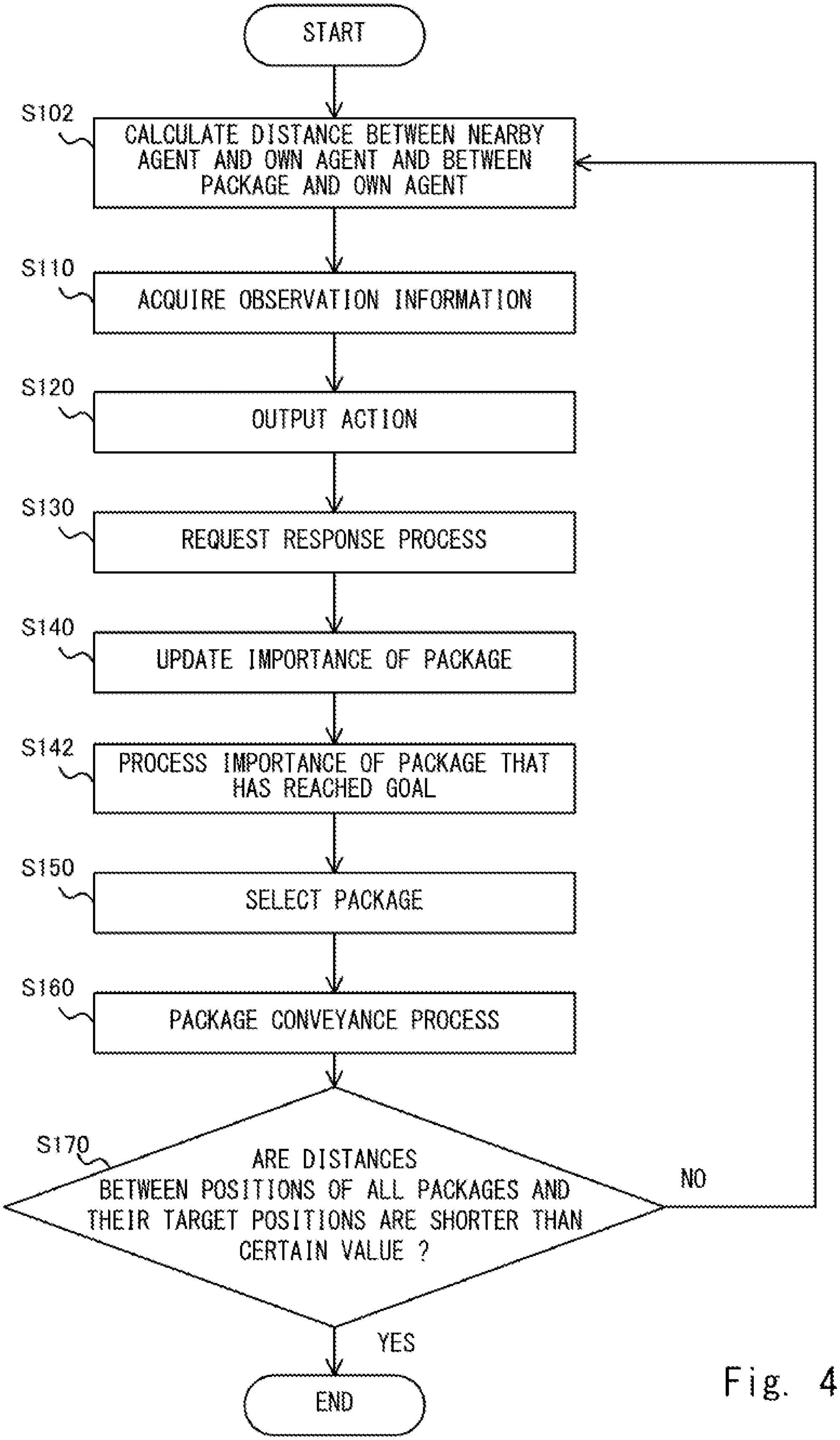
FIG. 4 is a flowchart showing a control method performed by the control apparatus according to the first embodiment.

FIG. 4 is a flowchart showing a control method performed by the control apparatus 100 according to the first embodiment. As described above, the observation information acquisition unit 110 calculates distances between nearby agents 10 and the own agent 10, and between packages (tasks 50) and the own agent 10 (Step S102). As described above, the observation information acquisition unit 110 acquires observation information $o_i$ of the own agent 10 (the agent #i) (Step S110).

As described above, the action output unit 120 outputs an action $a_i$ corresponding to the observation information $o_i$ by using the policy $\pi_{NN,i}$ (Step S120). The request response processing unit 130 performs a request response process (Step S130). Specifically, the request response processing unit 130 calculates a request parameter $d_i$ and a response parameter $\sigma_i$ for the own agent #i as described above.

The importance processing unit 140 updates the importance of the package, which is the task 50 (Step S140). Specifically, the importance processing unit 140 updates (calculates) the importance of the nearby task #l (the package) for the own agent #i as described above. Further, the importance processing unit 140 processes the importance of a package which has reached the goal (Step S142). Specifically, the importance processing unit 140 sets the importance of the task #l (the package), which has reached the goal and hence for which the target has been achieved, to zero as described above.

Further, the task selection unit 150 selects a package of which the importance is the highest for the own agent 10 as described above (Step S150). As described above, the task execution unit 160 performs processing so that the own agent 10 conveys the selected package (Step S160).

The control apparatus 100 determines whether or not the distances between the positions of all the packages and their target positions are shorter than a certain value (Step S170). Note that the fact that the distance between the position of a package and its target position is shorter than a certain value means that the package can be considered to have reached its target position. Therefore, the control apparatus 100 determines whether or not all the packages have reached their target positions. Note the “certain value” corresponds to $\delta$ (e.g., $\delta$=0.05) in Expression (25). When the distances between the positions of all the packages and their target positions are shorter than the certain value (Yes in S170), the processing flow ends. On the other hand, when at least one of the distances between the positions of all the packages and their target positions is not shorter than the certain value (No in S170), the processing flow returns to the step S102. Then, the processes in the steps S102 to S170 are repeated. The processes are repeated at the above-described control cycle.

As described above, the control apparatus 100 according to the first embodiment calculates a request parameter and a response parameter based on observation information, and performs processing for calculating the importance of each task for the agent based on the calculated request parameter and the response parameter. Then, the control apparatus 100 according to the first embodiment selects a task to be performed by the agent according to the importance, and controls the agent so that it performs the selected task. By the above-described configuration, the control apparatus 100 according to the first embodiment can appropriately select a task to be performed by the agent according to the importance calculated based on the observation information, the request parameter, and the response parameter. As a result, even in an environment in which tasks are not yet known, it is possible to prevent a large number of agents from concentrating on one task and thereby to realize such actions that an agent goes to help with a task that is not proceeding. Consequently, tasks reliably proceed. Therefore, it is possible to, even in an environment in which tasks are not yet known, efficiently achieve the target for the tasks. Consequently, it is possible, as a whole, to reduce the execution times (the total execution time) of the tasks.

Further, in the first embodiment, a plurality of policies are learned for the plurality of agents, respectively, and the control apparatus 100 calculates a request parameter and a response parameter based on the respective one of the plurality of policies (i.e., based on one of the plurality of policies that has been learned for the agent corresponding that control apparatus 100). Further, the control apparatus 100 according to the first embodiment is configured to calculate a request parameter and a response parameter based on a request level and a response level, respectively, which are output from the policy (which is, for example, a trained computer model as described above) by inputting the observation information into the policy. In this way, it is possible to calculate, for each agent, the importance of each of tasks so that the importance of a task that requires help may increase. Therefore, it is possible to appropriately select, for each agent, a task to be performed by that agent.

Further, the control apparatus 100 according to the first embodiment calculates a request parameter indicating that help should be requested when the request level exceeds a predetermined threshold and the task that the agent is performing or about to perform is not proceeding. By the above-described configuration, it is possible to appropriately calculate, when a request for help should be made for the task that the agent is performing or about to perform, a request parameter indicating that help should be requested. Therefore, it is possible to prevent a wasteful request from being made.

Further, the control apparatus 100 according to the first embodiment calculates, when the response level exceeds a predetermined threshold and the task that the agent is performing or about to perform is not proceeding, a response parameter indicating that a request should be responded to. By the above-described configuration, when a task that the agent is performing or about to perform is proceeding, the agent can continue performing the task. Therefore, it is possible to prevent a wasteful request from being made.

Further, in the first embodiment, a plurality of policies are learned for the plurality of agents, respectively, and the control apparatus 100 calculates importance of each of the tasks for the agent based on the policy that has been learned for that agent. By the above-described configuration, it is possible to appropriately calculate, for each agent, the importance of each of tasks for the agent.

Further, the control apparatus 100 according to the first embodiment calculates, based on a target value of the importance of the task corresponding to the observation information, which (i.e., the target value of the importance) is output from the policy by inputting the observation information into the policy (which is, for example, a trained computer model as described above), the importance of the task corresponding to the observation information for the agent. By the above-described configuration, it is possible to calculate, for each agent, the importance of a task corresponding to observation information so that the importance of the task gets closer to its target value. As a result, it is possible to appropriately calculate the importance of a task.

Second Embodiment

Next, a second embodiment will be described. Note that the configuration of a control system 1 according to the second embodiment is substantially similar to that of the control system 1 according to the first embodiment shown in FIG. 1, and therefore the description thereof is omitted. Further, the configuration of a control apparatus 100 according to the second embodiment is substantially similar to that of the control apparatus 100 according to the first embodiment shown in FIG. 2, and therefore the description thereof is omitted. In the second embodiment, tasks 50 are different from those in the first embodiment.

In the second embodiment, the task 50 is a place where there are a large number of packages to be conveyed. Further, a goal (a target position), which is the destination of conveyance, is set for each package. Further, the target of the task 50 according to the second embodiment is to make all the packages present in the place reach their respective goals. Note that unlike the first embodiment, packages conveyed in the second embodiment may be small enough to be conveyed by one agent 10. Note that the larger the number of agents 10 that convey the packages present in the place (the task 50) is, the more the possibility that the target of the place (the task 50) will be achieved (i.e., the possibility that all the packages in the place will reach their goals) increases.

The task 50 according to the second embodiment may be, for example, each room in a hospital. Further, in each room, which is a task 50, there may be medical records, medicines, specimens, and the like, which are packages to be conveyed. Further, the task 50 according to the second embodiment may be, for example, a place where relief supplies are placed in the event of a disaster. Further, the relief supplies may be packages to be conveyed.

In the second embodiment, similarly to the first embodiment, the observation information acquisition unit 110 acquires observation information $o_i$ represented by Expression (5). When doing so, the observation information acquisition unit 110 calculates a distance between the own agent #i and a place which is the task #l. Specifically, similarly to the first embodiment, the observation information acquisition unit 110 acquires the position of the place which is the task #l. The observation information acquisition unit 110 calculates, from the acquired position of the task #l (the place #l), a distance between the own agent #i and each task #l (each place #l). Then, the observation information acquisition unit 110 determines a predetermined number of neighboring tasks close to the own agent #i based on the distance between the own agent #i and each task #l (each place #l), and incorporates information about the neighboring tasks into the observation information. In the example of the above-shown Expressions (2) to (5), the neighboring tasks are a place #$l_1$ closest to the own agent #i and a place #$l_2$ second closest thereto.

Further, in the second embodiment, the term "o_($l_1$)^task" in Expression (5) may indicate the state and goal of each package present in the place #$l_1$, which is the neighboring task. The state of each package may be the position and speed of each package. Note that the term "o_($l_1$)^task" may indicate an average of states (positions and speeds) of the packages present in the place #$l_1$, which is the neighboring task, and an average position of goals of these packages. The average position may be the center of gravity (the geometric center) of the positions (the goals). Alternatively, the term "o_($l_1$)^task" may indicate the number of packages present in the place #$l_1$, which is the neighboring task, and the target for the number of packages (i.e., zero). The same applies to the term "o_($l_2$)^task".

In the second embodiment, similarly to the first embodiment, the policy storage unit 112 stores a policy π that has already been learned through reinforcement learning (i.e., a trained model). The policy π is learned for each agent 10. The policy $\pi_{NN,i}$ of the agent #i receives the above-described observation information $o_i$ as an input and outputs an action $a_i$ represented by the above-shown Expression (12). Further, similarly to the first embodiment, the policy $\pi_{NN,i}$ has been learned so as to maximize a reward $r_i(t)$ represented by the above-shown Expression (14).

Note that in the second embodiment, the term $P_l(t)$ for the achievement level of the task #l may indicate a conveyance achievement level of packages present in the place #l at a time t. The conveyance achievement level may correspond to, for example, the ratio of the number of packages that have already been conveyed to the goals to the number of packages that are originally present in the place #l. Further, in the second embodiment, the term $Q_l(t)$ for the progress of the task #l may be a reduction level of packages at the time t. The reduction level of packages may correspond to, for example, the number of packages that are reduced (conveyed) from the place #l per unit time.

Figure 5:
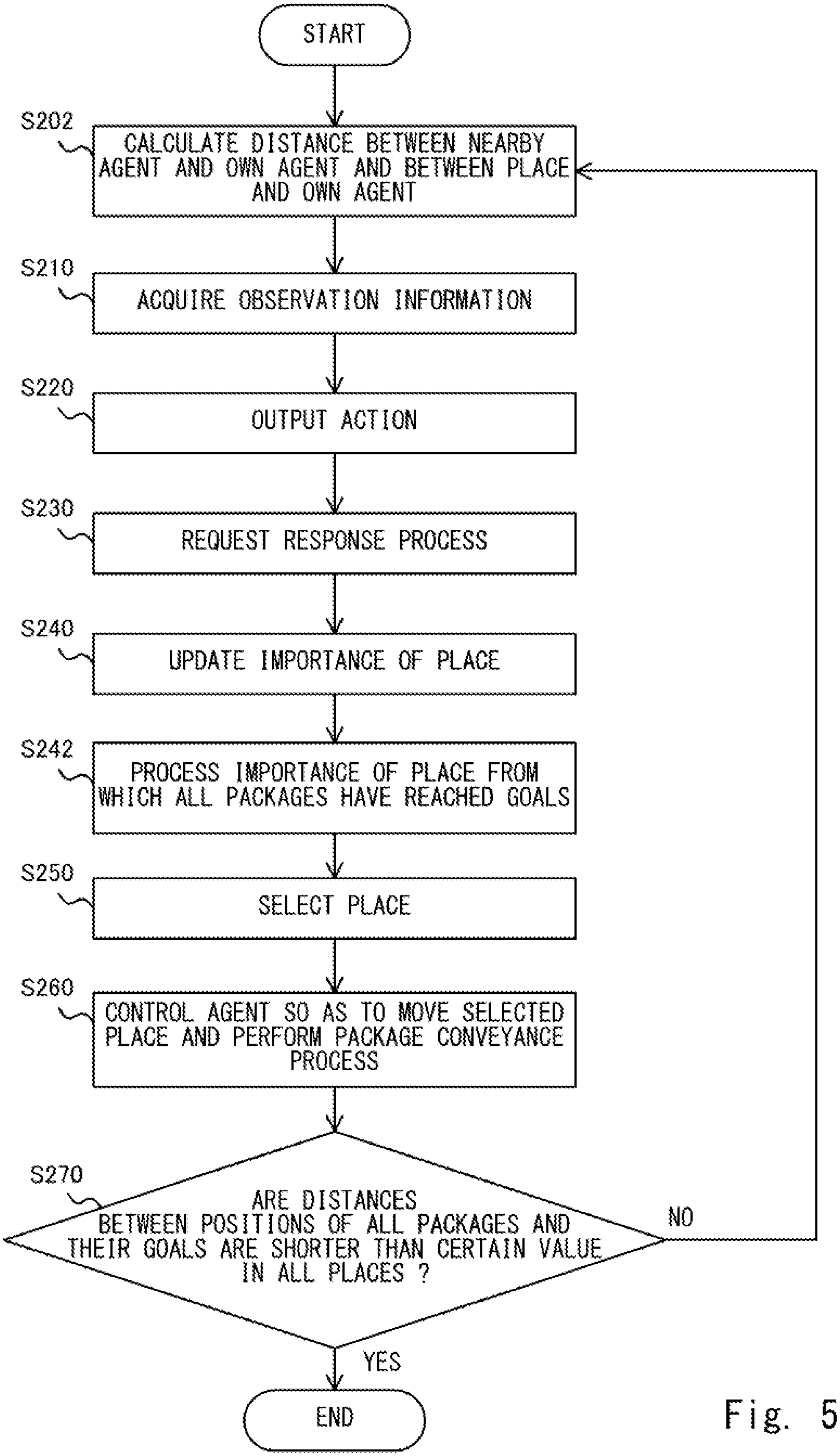
FIG. 5 is a flowchart showing a control method performed by a control apparatus according to a second embodiment.

FIG. 5 is a flowchart showing a control method performed by the control apparatus 100 according to the second embodiment. As described above, the observation information acquisition unit 110 calculates distances between nearby agents 10 and the own agent 10, and between packages (tasks 50) and the own agent 10 (Step S202). As described above, the observation information acquisition unit 110 acquires observation information $o_i$ of the own agent 10 (the agent #i) (Step S210). Similarly to the first embodiment, the action output unit 120 outputs an action $a_i$ corresponding to the observation information $o_i$ by using the policy $\pi_{NN,i}$ (Step S220).

Similarly to the first embodiment, the request response processing unit 130 performs a request response process (Step S230). Specifically, the request response processing unit 130 may calculate a request parameter $d_i$ of the own agent #i by using the above-shown Expression (18). Further, the request response processing unit 130 may calculate a response parameter $\sigma_i$ for the own agent #i by using the above-shown Expression (19).

Similarly to the first embodiment, the importance processing unit 140 updates the importance of the place, which is the task 50 (Step S240). That is, similarly to the first embodiment, the importance processing unit 140 acquires, from the control apparatus 100 of each of other nearby agents #j, a request parameter $d_j$ for that nearby agent #j and the importance $\varphi_j^l$ of each task #l (each place #l). Then, the importance processing unit 140 updates (calculates) the importance $\varphi_i^l$ for the nearby task #l (the place #l) for the own agent #i. The importance processing unit 140 may update the importance $\varphi_i^l$ for each task #l (each place #l) for the own agent #i by using the above-shown Expressions (23) and (24).

The importance processing unit 140 processes the importance of the place from which all the packages have reached the goals (Step S242). Specifically, similarly to the first embodiment, the importance processing unit 140 sets the importance $\varphi_i^l$ of the place #l for the own agent #i from which all the packages have reached the goals to zero.

Similarly to the first embodiment, the task selection unit 150 selects the place for the own agent 10 of which the importance is the highest (Step S250). That is, similarly to the first embodiment, the task selection unit 150 may select the place #l of which the importance $\varphi_i^l$ is the highest for the own agent #i by using the above-shown Expression (26).

The task execution unit 160 performs control so that the own agent 10 moves to the selected place and conveys the packages (Step S260). Specifically, the task execution unit 160 controls the agent #i so as to move to the selected place $l_i$*. Further, the task execution unit 160 controls the agent #i so that when the agent #i has moved to the place $l_i$*, it conveys the packages present in the place $l_i$* to their goals. The method for conveying packages is similarly to the method in the above-described first embodiment.

The control apparatus 100 determines whether or not, in all the places, the distances between the positions of all the packages and their goals are shorter than a certain value (Step S270). Note that the fact that the distance between the position of a package and its goal is shorter than a certain value means that the package can be considered to have reached its goal. Therefore, the control apparatus 100 determines whether or not, in all the places, all the packages have already reached the goals. Note that the "certain value" may correspond to $\delta$ in Expression (25). When the distances between the positions of all the packages and their goals are shorter than the certain value in all the places (Yes in S270), the processing flow ends. On the other hand, when at least one of the distances between the positions of all the packages and their goals is not shorter than the certain value in any one of the places (No in S270), the processing flow returns to the step S202. Then, the processes in the steps S202 to S270 are repeated. The processes are repeated at the above-described control cycle.

Similarly to the first embodiment, the control apparatus 100 according to the second embodiment calculates a request parameter and a response parameter based on observation information, and performs processing for calculating the importance of each task for the agent based on the calculated request parameter and the response parameter. Then, the control apparatus 100 according to the second embodiment selects a task to be performed by the agent according to the importance, and controls the agent so that it performs the selected task. Therefore, similarly to the first embodiment, the control apparatus 100 according to the second embodiment can appropriately select a task to be performed by the agent according to the importance calculated based on the observation information, the request parameter, and the response parameter. As a result, even in an environment in which tasks are not yet known, it is possible to prevent a large number of agents from concentrating on one task and thereby to realize such actions that an agent goes to help with a task that is not proceeding. Consequently, tasks reliably proceed. Therefore, it is possible to, even in an environment in which tasks are not yet known, efficiently achieve the target for the tasks. Consequently, it is possible, as a whole, to reduce the execution times (the total execution time) of the tasks.

(Modified Examples of First and Second Embodiments)

Note that although it has been assumed that the agent 10 is a machine such as a robot in the first and second embodiments, the agent 10 does not have to be a machine. The agents 10 may include machines and human beings. That is, a robot and a human being may convey a plurality of packages in cooperation with each other. In such a case, the human being may carry a communication terminal capable of communicating with the control apparatus 100 for the agent 10. Note that an agent 10, which is a machine, may be controlled by processes substantially similar to those performed in the above-described first and second embodiments.

When doing so, the control apparatus 100 of the agent 10, which is a machine, may transmit its own request parameter and the importance of each task to the communication terminal carried by the human being. The human being may, from the request parameter acquired from the other agent 10 and the importance of each task acquired from the other agent 10 and through a decision made by himself/herself, respond to the agent 10, which has transmitted the request parameter indicating that help is requested, and go to help with the task that the agent 10 is performing. Note that the human being may independently determine the package to be conveyed through his/her own decision by using the sense of accomplishment obtained by the completion of the conveyance of the package as the behavioral principle. Note that the human being does not request help from other agents 10. That is, the human being does not have to transmit a request parameter indicating that help is requested to other agents 10. This is because a timing at which a human being makes a request cannot be simulated in the learning of policies for a robot agent 10. Therefore, there is a risk that if the human being requests help, the robot agent 10 may eventually exhibit an undesirable behavior.

Third Embodiment

Next, a third embodiment will be described. Note that the configuration of a control system 1 according to the third embodiment is substantially similar to that of the control system 1 according to the first embodiment shown in FIG. 1, and therefore the description thereof is omitted. Further, the configuration of a control apparatus 100 according to the third embodiment is substantially similar to that of the control apparatus 100 according to the first embodiment shown in FIG. 2, and therefore the description thereof is omitted. In the third embodiment, tasks 50 are different from those in the above-described embodiments. Note that in the above-described embodiments, the target for a task 50 is achieved as the agent 10 conveys a package. In contrast, in the third embodiment, the agent 10 does not have to convey a package when it carries out a task 50. A specific example of the task 50 in the third embodiment will be described later. Similarly to the first embodiment, the agent 10 autonomously operates in an environment under the control of the control apparatus 100. Further, in the third embodiment, the monitoring apparatus 60 does not have to monitor the task 50. Each agent 10 may monitor (detect) the state of its task 50.

Figure 6:
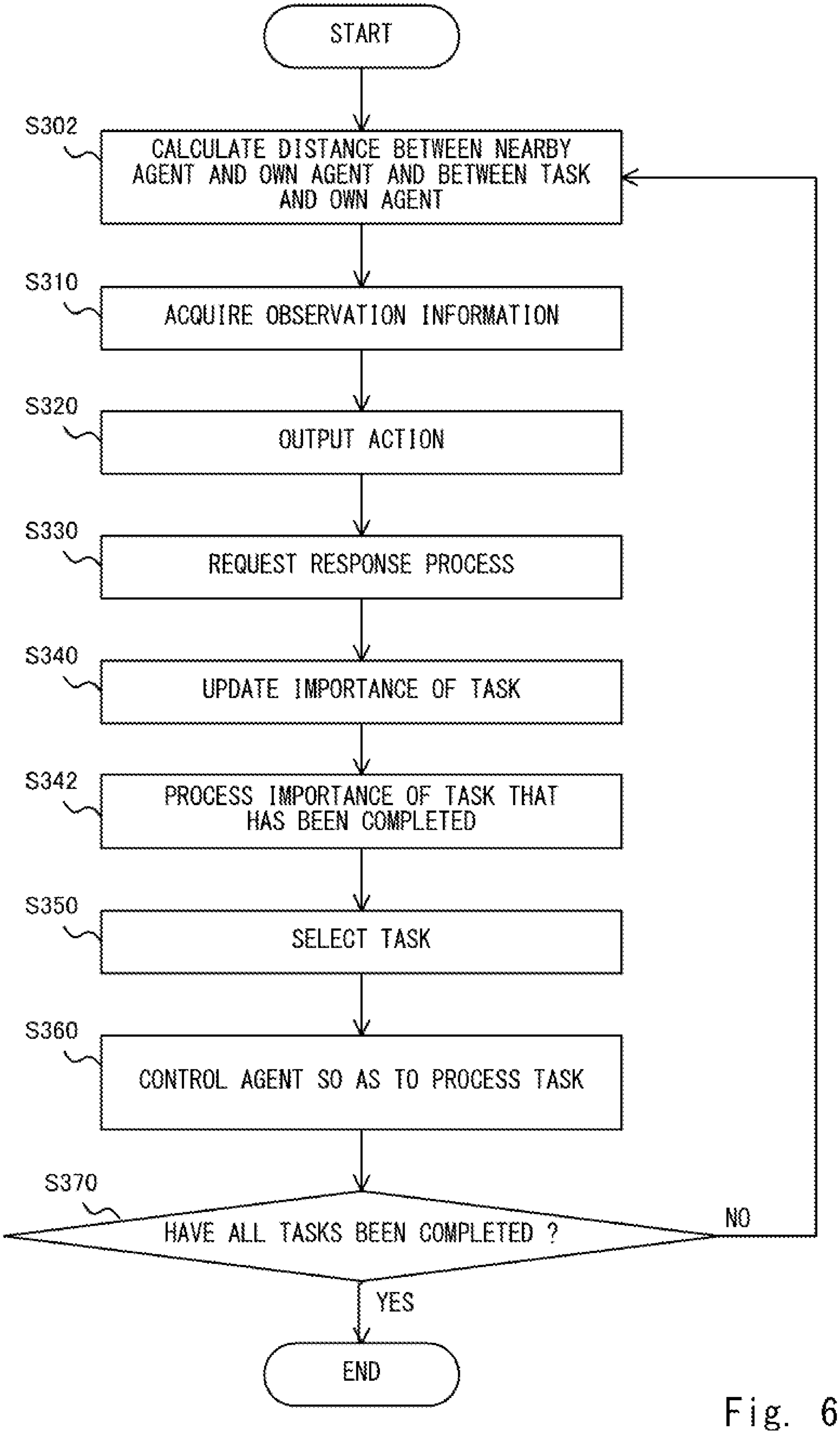
FIG. 6 is a flowchart showing a control method performed by a control apparatus according to a third embodiment.

FIG. 6 is a flowchart showing a control method performed by the control apparatus 100 according to the third embodiment. Similarly to the steps S102 and S202, the observation information acquisition unit 110 calculates distances between nearby agents 10 and the own agent 10, and between tasks 50 and the own agent 10 (Step S302). Similarly to the steps S110 and S210, the observation information acquisition unit 110 acquires observation information $o_i$ of the own agent 10 (the agent #i) (Step S310). The observation information $o_i$ will be described later. Similarly to the steps S120 and S220, the action output unit 120 outputs an action $a_i$ corresponding to the observation information $o_i$ by using the policy $\pi_{NN,i}$ (Step S320). The reward $r_i(t)$ for the policy $\pi_{NN,i}$ will be described later.

Similarly to the steps S130 and S230, the request response processing unit 130 performs a request response process (Step S330). Specifically, the request response processing unit 130 may calculate a request parameter $d_i$ of the own agent #i by using the above-shown Expression (18). Further, the request response processing unit 130 may calculate a response parameter $\sigma_i$ for the own agent #i by using the above-shown Expression (19).

Similarly to the steps S140 and S240, the importance processing unit 140 updates the importance of the task 50 (Step S340). Specifically, similarly to the above-described embodiments, the importance processing unit 140 acquires, from the control apparatus 100 of each of other nearby agents #j, a request parameter $d_j$ for that nearby agent #j and the importance $\varphi_j^l$ of each task #l. Then, similarly to the above-described embodiments, the importance processing unit 140 updates (calculates) the importance $\varphi_i^l$ for the nearby task #l for the own agent #i. The importance processing unit 140 may update the importance $\varphi_i^l$ for each task #l for the own agent #i by using the above-shown Expressions (23) and (24).

Similarly to the steps S142 and S242, the importance processing unit 140 processes the importance of the completed task (Step S342). Specifically, similarly to the above-described embodiments, the importance processing unit 140 sets the importance $\varphi_i^l$ of the task #l for the own agent #i for which the target has been achieved to zero.

Similarly to the steps S150 and S250, the task selection unit 150 selects the task 50 for the own agent 10 of which the importance is the highest (Step S350). Specifically, similarly to the above-described embodiments, the task selection unit 150 may select the task #l of which the importance $\varphi_i^l$ is the highest for the own agent #i by using the above-shown Expression (26).

Similarly to the steps S160 and S260, the task execution unit 160 performs control so that the own agent 10 carries out the selected task 50 (Step S360). Specifically, the task execution unit 160 controls the agent #i so as to move to the position of the selected task $l_1$*. Further, the task execution unit 160 controls the agent #i so that when the agent #i has moved to the position of the task $l_i$*, it performs the task $l_i$*. A specific example of the task 50 will be described later.

The control apparatus 100 determines whether or not all the tasks 50 have been completed (Step S370). When all the tasks 50 have been completed (Yes in S370), the processing flow ends. On the other hand, when at least one of the tasks 50 has not been completed (No in S370), the processing flow returns to the step S302. Then, the processes in the steps S302 to S370 are repeated. The processes are repeated at the above-described control cycle.

Similarly to the first embodiment, the control apparatus 100 according to the third embodiment calculates a request parameter and a response parameter based on observation information, and performs processing for calculating the importance of each task for the agent based on the calculated request parameter and the response parameter. Then, the control apparatus 100 according to the third embodiment selects a task to be performed by the agent according to the importance, and controls the agent so that it performs the selected task. Therefore, similarly to the first embodiment, the control apparatus 100 according to the third embodiment can appropriately select a task to be performed by the agent according to the importance calculated based on the observation information, the request parameter, and the response parameter. As a result, even in an environment in which tasks are not yet known, it is possible to prevent a plurality of agents from unnecessarily concentrating on one task and thereby to realize such actions that an agent goes to help with a task that is not proceeding. Consequently, tasks reliably proceed. Therefore, it is possible to, even in an environment in which tasks are not yet known, efficiently achieve the target for the tasks. Consequently, it is possible, as a whole, to reduce the execution times (the total execution time) of the tasks.

Specific Example 1 of Third Embodiment

In a Specific Example 1, the method according to this embodiment is applied to maintenance. In the Specific Example 1, maintenance (an inspection) of a structure is performed by a plurality of agents 10, which are machines such as robots. Further, in the Specific Example 1, the plurality of agents 10 inspect structures in a wide range. Note that in the Specific Example 1, tasks 50 are inspection points, respectively. Further, in the Specific Example 1, the target for a task 50 is to perform a multi-faceted inspection on a respective inspection point. Note that the plurality of agents 10 may have functions different from each other. Therefore, the plurality of agents 10 may be composed of agents 10 of different types. The plurality of agents 10 of different types can carry out a multi-faceted inspection. Therefore, the higher the number of agents 10 is, the more the possibility that the target for the task 50 will be achieved increases.

For example, a certain agent 10 may be a search robot that searches for an abnormal part. Further, another agent 10 may be a countermeasure robot that copes with an abnormality. Further, a certain agent 10 (a search robot) may include a camera that photographs an inspection point and determine the seriousness of the abnormal part from an image(s) obtained by the photographing. Further, a certain agent 10 may have a function for performing a first non-destructive inspection (e.g., an infrared examination). Further, another agent 10 may have a function for performing a second non-destructive inspection (e.g., an ultrasonic test). Further, another agent 10 may have a function for performing a third non-destructive inspection (e.g., a radiolucency test). Further, another agent 10 may have a function for performing a fourth non-destructive inspection (e.g., an eddy-current flaw test).

In the Specific Example 1, similarly to the above-described embodiments, the observation information acquisition unit 110 acquires observation information $o_i$ represented by Expression (5) (S310). When doing so, the observation information acquisition unit 110 calculates a distance between the own agent #i and the task #l (the inspection point #l) (S302). Specifically, similarly to the first embodiment, the observation information acquisition unit 110 acquires the position of the inspection point which is the task #l. The observation information acquisition unit 110 calculates, from the acquired position of the task #l (the inspection point #l), a distance between the own agent #i and each task #l (each inspection point #l). Then, the observation information acquisition unit 110 determines a predetermined number of neighboring tasks close to the own agent #i based on the distance between the own agent #i and each task #l (each inspection point #l), and incorporates information about the neighboring tasks into the observation information. In the example of the above-shown Expressions (2) to (5), the neighboring tasks are an inspection point $\#l_1$ closest to the own agent #i and an inspection point $\#l_2$ second closest thereto.

Further, in the Specific Example 1, the term "o_($l_1$)^task" in Expression (5) may indicate the state of the inspection point $\#l_1$, which is the neighboring task, and the condition for finishing the inspection. The state of each inspection point may be the position of the inspection point, details of the performed inspection, and the seriousness of the abnormality. The condition for finishing the inspection may be conditions that all types of agents 10 should reach the inspection point and all types of inspections (multi-faceted inspections) should be performed. The same applies to the term "o_($l_2$)^task".

In the Specific Example 1, similarly to the above-described embodiments, the policy storage unit 112 stores a policy $\pi$ that has already been learned through reinforcement learning (i.e., a trained model). The policy $\pi$ is learned for each agent 10. The policy $\pi_{NN,i}$ of the agent #i receives the above-described observation information $o_i$ as an input and outputs an action $a_i$ represented by the above-shown Expression (12). Further, similarly to the first embodiment, the policy $\pi_{NN,i}$ has been learned so as to maximize a reward $r_i(t)$ represented by the above-shown Expression (14).

Note that in the Specific Example 1, the term $P_l(t)$ for the achievement level of the task #l may indicate an achievement level of the inspection at the inspection point #l at a time t. The achievement level of the inspection may correspond to, for example, the number of types of agents 10 that have reached the serious inspection point #l and performed some process. Alternatively, the achievement level of the inspection may be the number of inspection items that have already carried out. Further, in the Specific Example 1, the term $Q_l(t)$ for the progress of the task #l may be the progress of the inspection at the inspection point #l at the time t. The progress of the inspection may correspond to the number of agents 10 that reach the serious inspection point #l per unit time. Alternatively, the progress of the inspection may be the number of inspection items that have been carried out per unit time.

Further, in the Specific Example 1, similarly to the above-described embodiments, the request response processing unit 130 calculates a request parameter $d_i$ and a response parameter $\sigma_i$ for the agent #i from the action $a_i$ that has been output from the policy $\pi_{NN,i}$ (S330). Then, the request response processing unit 130 transmits the calculated request parameter $d_i$ to the control apparatus 100 of a nearby agent(s) 10. Further, in the Specific Example 1, similarly to the above-described embodiments, the importance processing unit 140 updates (calculates) the importance $\varphi_i^l$ of the nearby task #l (the inspection point #l) for the own agent #i (S340 and S342). The importance processing unit 140 may update the importance $\varphi_i^l$ for each task #l (the inspection point #l) for the own agent #i by using the above-shown Expressions (23) and (24). Further, in the Specific Example 1, similarly to the above-described embodiments, the task selection unit 150 selects, based on the below-shown Expression (26), the task #l (the inspection point #l) of which the importance $\varphi_i^l$ is the highest among all the tasks #l as the task $\#l_i^*$ to be performed by the own agent #i (S350).

Note that in the Specific Example 1, the request response processing unit 130 may transmit the request parameter to the control apparatus 100 of the agent 10 of a type different from that of the own agent #i. In this way, the possibility that an agent 10 of a type different from that of the own agent #i will reach the inspection point increases. Conversely, the possibility that an agent 10 of the same type as that of the own agent #i will reach the inspection point decreases. That is, it is presumed that when an agent #i, which is a search robot, has detected a serious inspection point #l, the request level output from the policy will increase in the control apparatus 100 of that agent #i. Then, the control apparatus 100 of the agent #i, which is a search robot, transmits a request parameter equal to one ($d_i$=1) to the control apparatus 100 of an agent 10 of a different type (such as an agent 10 that performs a non-destructive inspection or the like). It this way, it is presumed that the importance of the inspection point #l increases in the control apparatus 100 of an agent 10 of a different type (such as an agent 10 that performs a non-destructive inspection or the like). Therefore, the possibility that the inspection point #l is selected in the control apparatus 100 of an agent 10 of a different type (such as an agent 10 that performs a non-destructive inspection or the like), and therefore the agent 10 of the different type will reach the inspection point #l increases. As a result, the possibility of the target for the task 50 being achieved increases. Note that if information as to which inspection point has not been inspected yet is added to the observation information, the agent, which has acquired the observation information, can determine, in a proactive manner, whether or not it should respond to the request for help for that inspection point.

Further, in the Specific Example 1, the task execution unit 160 performs control so that the own agent #i carries out the selected task #l (the inspection point #l) (S360). Specifically, the task execution unit 160 moves the agent #i to the position of the task $\#l_i^*$ (the inspection point $\#l_i^*$). The task execution unit 160 controls the own agent #i so that it performs an inspection suitable for the function of the own agent #i. Then, the control apparatus 100 of each agent 10 performs processing so that multi-faceted inspections are performed on all the inspection points.

Specific Example 2 of Third Embodiment

In a Specific Example 2, the method according to this embodiment is applied to watching, inspecting, and security. In the Specific Example 2, an environment is preserved or maintained by a plurality of agents 10, which are machines such as robots. Specifically, the plurality of agents 10 patrol, watch, patrol, and inspect the environment, and perform processing for security and the like. The plurality of agents 10 patrol the environment and thereby search for a problem or the like occurring in the environment. Further, in the Specific Example 2, when a problem is found, the control apparatus 100 of the agent 10, which has found the problem, transmits information about the found problem to the control apparatus 100 of a nearby agent(s) 10. Note that in the Specific Example 2, the task 50 is a "found problem". Further, in the Specific Example 2, the target for the task 50 is to solve the found problem. The higher the number of agents 10 is, the more the possibility that the target for the task 50 will be achieved increases.

Further, in the Specific Example 2, the plurality of agents 10 may have a function of coping with the found problem. Further, similarly to the Specific Example 1, the plurality of agents 10 may have functions different from each other. For example, when the found problem is "removing a large-sized unwanted article", an agent 10 that can convey a large-sized unwanted article may remove the large-sized unwanted article. Further, when the found problem is "arresting a criminal", an agent 10 that can arrest a criminal may arrest the criminal. Further, when the found problem is "attending a person who have lost his/her way", an agent 10 that can show a person the way to his/her destination may attend the person who have lost his/her way. Note that in the following description, the "found problem" is also referred to simply as the "problem".

In the Specific Example 2, similarly to the above-described embodiments, the observation information acquisition unit 110 acquires observation information $o_i$ represented by Expression (5) (S310). When doing so, the observation information acquisition unit 110 calculates a distance between the own agent #i and the task #l (the problem #l) (S302). Specifically, similarly to the first embodiment, the observation information acquisition unit 110 acquires the position of the "found problem", which is the task #l. The position of the "fount problem" may be the position of the agent 10 that has found the problem at the time of the searching. The observation information acquisition unit 110 calculates, from the acquired position of the task #l (the problem #l), a distance between the own agent #i and each task #l (each problem #l). Then, the observation information acquisition unit 110 determines a predetermined number of neighboring tasks close to the own agent #i based on the distance between the own agent #i and each task #l (each problem #l), and incorporates information about the neighboring tasks into the observation information. In the example of the above-shown Expressions (2) to (5), the neighboring tasks are a problem $\#l_1$ closest to the own agent #i and a problem $\#l_2$ second closest thereto.

Further, in the Specific Example 2, the term "$o\_(l_1)\hat{}task$" in Expression (5) may indicate the state of the problem $\#l_1$, which is the neighboring task, and the condition for finishing the problem. The state of each problem may be the position of the problem, the progress of the solution of the problem, the nature of the problem, and the type of the problem. The condition for finishing the problem may be a condition that the problem should be solved. The same applies to the term "$o\_(l_2)\hat{}task$".

In the Specific Example 2, similarly to the above-described embodiments, the policy storage unit 112 stores a policy π that has already been learned through reinforcement learning (i.e., a trained model). The policy π is learned for each agent 10. The policy $\pi_{NN,i}$ of the agent #i receives the above-described observation information $o_i$ as an input and outputs an action $a_i$ represented by the above-shown Expression (12). Further, similarly to the first embodiment, the policy $\pi_{NN,i}$ has been learned so as to maximize a reward $r_i(t)$ represented by the above-shown Expression (14).

Note that in the Specific Example 2, the term $P_l(t)$ for the achievement level of the task #l may indicate an achievement level of the solution for the problem #l at a time t. The achievement level of the solution for the problem may correspond to, for example, the completion of the handling of the problem by an agent 10 that can cope with the problem. Further, in the Specific Example 2, the term $Q_l(t)$ for the progress of the task #l may be the progress of the handling of the problem #l at the time t. The progress of the handling of the problem may correspond to, for example, the state in which the agent 10, which can cope with the problem, is coping with the problem.

Further, in the Specific Example 2, similarly to the above-described embodiments, the request response processing unit 130 calculates a request parameter $d_i$ and a response parameter $\sigma_i$ for the agent #i from the action $a_i$ that has been output from the policy $\pi_{NN,i}$ (S330). Then, the request response processing unit 130 transmits the calculated request parameter $d_i$ to the control apparatus 100 of a nearby agent(s) 10. In this process, the control apparatus 100 may transmit the request parameter to a terminal carried by a human being as in the modified example of the first and second embodiments. In this way, the human being may cope with the problem. Further, similarly to the Specific Example 1, the control apparatus 100 may transmit the request parameter to the control apparatus 100 of the agent 10 of a type different from that of the own agent #i.

Further, in the Specific Example 2, similarly to the above-described embodiments, the importance processing unit 140 updates (calculates) the importance $\varphi_i^l$ of the nearby task #l (the problem #l) for the own agent #i (S340 and S342). The importance processing unit 140 may update the importance $\varphi_i^l$ for each task #l (each problem #l) for the own agent #i by using the above-shown Expressions (23) and (24). Further, in the Specific Example 2, similarly to the above-described embodiments, the task selection unit 150 selects, based on the below-shown Expression (26), the task #l (the problem #l) of which the importance $\varphi_i^l$ is the highest among all the task #l as the task $\#l_i^*$ to be performed by the own agent #i (S350).

Note that it is presumed that when the agent #i, which has found the problem #l, does not have a function of coping with this problem, the request level output from the policy will increase in the control apparatus 100 of that agent #i. Then, the control apparatus 100 of the agent #i transmits a request parameter equal to one ($d_i$=1) to the control apparatus 100 of a nearby agent(s) 10. Further, it is presumed that as observation information indicating the nature and type of the problem, and the above-described request parameter are acquired in, among the nearby agents 10, the control apparatus 100 of the agent 10, which can cope with the problem, the importance of the problem #l increases. Therefore, the possibility that the problem #l is selected in the control apparatus 100 of the agent 10, which can cope with the problem, and the agent 10, which can cope with the problem, will reach the position of that problem #l increases. Note that if information as to which problem has not been handled yet is added to the observation information, the agent, which has acquired the observation information, can determine, in a proactive manner, whether or not it should respond to the request for help for that problem.

Further, in the Specific Example 2, the task execution unit 160 performs control so that the own agent #i carries out the selected task #l (the problem #l) (S360). Specifically, the task execution unit 160 moves the agent #i to the position of the task $\#l_i^*$ (the problem $\#l_i^*$). The task execution unit 160 controls the own agent #i so that it performs the handling of the problem that the own agent #i can perform. Then, the control apparatus 100 of each agent 10 performs processing so that all the found problems are solved.

Specific Example 3 of Third Embodiment

In a Specific Example 3, the method according to this embodiment is applied to coexistence with nature. In the Specific Example 3, animals are monitored and their movements are controlled by a plurality of agents 10, which are machines such as robots. In this way, it is possible to prevent animals from entering farms, and thereby to reduce agricultural damages while realizing a sustainable ecosystem.

In the Specific Example 3, a plurality of agents 10 detect an object moving in a farm or an area around the farm, and thereby detect an animal. Further, the plurality of agents 10 may have functions different from each other. That is, similarly to the Specific Example 1, the plurality of agents 10 may be composed of agents of different types. In this case, a certain agent 10 may have a function of searching for an animal. Further, another agent 10 may have a function of driving an animal out of a farm. Alternatively, each of the plurality of agents 10 may have both a function of searching for an animal and a function of driving an animal out of a farm. That is, the plurality of agents 10 may be the same type as each other. Note that the control apparatus 100 of an agent 10 that has detected an animal transmits information about the animal (such as the position of the animal) to the control apparatuses 100 of other agents 10. Note that in the Specific Example 3, the task 50 is a detected animal. Further, in the Specific Example 3, the target for the task 50 is the removal of the animal. The higher the number of agents 10 is, the more the possibility that the target for the task 50 will be achieved increases.

In the Specific Example 3, similarly to the above-described embodiments, the observation information acquisition unit 110 acquires observation information $o_i$ represented by Expression (5) (S310). When doing so, the observation information acquisition unit 110 calculates a distance between the own agent #i and the task #l (the animal #l) (S302). Specifically, similarly to the first embodiment, the observation information acquisition unit 110 acquires the position of the "animal", which is the task #l. The observation information acquisition unit 110 calculates, from the acquired position of the task #l (the animal #l), a distance between the own agent #i and each task #l (each animal #l). Then, the observation information acquisition unit 110 determines a predetermined number of neighboring tasks close to the own agent #i based on the distance between the own agent #i and each task #l (each animal #l), and incorporates information about the neighboring tasks into the observation information. In the example of the above-shown Expressions (2) to (5), the neighboring tasks are an animal $\#l_1$ closest to the own agent #i and an animal $\#l_2$ second closest thereto.

Further, in the Specific Example 3, the term "o_($l_1$)^task" in Expression (5) may indicate the state of the animal $\#l_1$, which is the neighboring task, and the destination (the goal) to which the animal $\#l_1$ is removed (e.g., transferred). The state of the animal may be the position and speed of the animal. The destination to which the animal $\#l_1$ is removed may correspond to the territory where the animal originally lived. The same applies to the term "o_($l_2$)^task".

In the Specific Example 3, similarly to the above-described embodiments, the policy storage unit 112 stores a policy π that has already been learned through reinforcement learning (i.e., a trained model). The policy π is learned for each agent 10. The policy $\pi_{NN,i}$ of the agent #i receives the above-described observation information $o_i$ as an input and outputs an action $a_i$ represented by the above-shown Expression (12). Further, similarly to the first embodiment, the policy $\pi_{NN,i}$ has been learned so as to maximize a reward $r_i(t)$ represented by the above-shown Expression (14).

Note that in the Specific Example 3, the term $P_l(t)$ for the achievement level of the task #l may indicate a distance to the boundary of a range to be protected from animals (a range that should not be invaded by animals) at a time t. Further, in the Specific Example 3, the term $Q_l(t)$ for the progress of the task #l may be the moving speed of the animal #l to the goal at the time t.

Further, in the Specific Example 3, similarly to the above-described embodiments, the request response processing unit 130 calculates a request parameter $d_i$ and a response parameter $\sigma_i$ for the agent #i from the action $a_i$ that has been output from the policy $\pi_{NN,i}$ (S330). Then, the request response processing unit 130 transmits the calculated request parameter $d_i$ to the control apparatus 100 of a nearby agent(s) 10. In this process, the control apparatus 100 may transmit the request parameter to a terminal carried by a human being as in the modified example of the first and second embodiments. In this way, the human being may drive the animal out of the farm or the like.

Further, in the Specific Example 3, similarly to the above-described embodiments, the importance processing unit 140 updates (calculates) the importance $\varphi_i^l$ of the nearby task #l (the animal #l) for the own agent #i (S340 and S342). The importance processing unit 140 may update the importance $\varphi_i^l$ for each task #l (each animal #l) for the own agent #i by using the above-shown Expressions (23) and (24). Further, in the Specific Example 3, similarly to the above-described embodiments, the task selection unit 150 selects, based on the below-shown Expression (26), the task #l (the animal #l) of which the importance $\varphi_i^l$ is the highest among all the task #l as the task $\#l_i$* to be performed by the own agent #i (S350).

Note that when the plurality of agents 10 are composed of agents 10 of different types, similarly to the Specific Example 1, the request response processing unit 130 may transmit a request parameter to the control apparatus 100 of the agent #i of a type different from that of the own agent #i. In this way, the possibility that an agent 10 of a type different from that of the own agent #i will reach the animal increases. As a result, similarly to the Specific Example 1, when an agent #i having a function of searching for an animal has detected an animal, the possibility that an agent 10 having a function of driving an animal out of the farm will reach the animal increases.

Further, in the Specific Example 3, the task execution unit 160 performs control so that the own agent #i performs the selected task #l (the control of the animal #l) (S360). Specifically, the task execution unit 160 moves the agent #i to the position of the task $\#l_i$* (the animal $\#l_i$*). The task execution unit 160 controls the own agent #i so as to drive the animal out of the farm (driving the animal away from the farm). Then, the control apparatus 100 of each agent 10 performs processing so that all the animals are driven out of the farm (the animal are driven away from the farm).

Specific Example 4 of Third Embodiment

In the Specific Example 4, the method according to this embodiment is applied to provision of various services. In the Specific Example 4, people living in an environment are supported by a plurality of agents 10, which are machines such as robots. In this way, the comfort level of people can be improved. Specifically, the plurality of agents 10 patrol the environment and perform processing for satisfying people's needs. The agents 10 patrol the environment and solve problems of which solutions are requested by people. Further, in the Specific Example 4, when it is requested to solve a problem, the control apparatus 100 of the agent 10, which has been requested to solve the problem, transmits information about the problem concerned to the control apparatus 100 of a nearby agent(s) 10. Note that in the Specific Example 4, the task 50 is a "problem concerned" (i.e., a problem of which the solution is requested by people). Further, in the Specific Example 4, the target for the task 50 is to solve the problem concerned. The higher the number of agents 10 is, the more the possibility that the target for the task 50 will be achieved increases.

Further, in the Specific Example 4, the plurality of agents 10 may have a function of coping with the problem concerned. Further, similarly to the Specific Example 1, the plurality of agents 10 may have functions different from each other. For example, when the problem concerned is "removing a large-sized unwanted article", an agent 10 that can convey a large-sized unwanted article may remove the large-sized unwanted article. Further, when the problem concerned is "arresting a criminal", an agent 10 that can arrest a criminal may arrest the criminal. Further, when the problem concerned is "attending a person who have lost his/her way", an agent 10 that can show a person the way to his/her destination may attend the person who have lost his/her way. Note that in the following description, the "problem concerned" is also referred to simply as the "problem".

In the Specific Example 4, similarly to the above-described embodiments, the observation information acquisition unit 110 acquires observation information $o_i$ represented by Expression (5) (S310). When doing so, the observation information acquisition unit 110 calculates a distance between the own agent #i and the task #l (the problem #l) (S302). Specifically, similarly to the first embodiment, the observation information acquisition unit 110 acquires the position of the "problem concerned", which is the task #l. The position of the "problem concerned" may be the position of the agent 10 that has been request to solve the problem at the time when the agent 10 was requested. The observation information acquisition unit 110 calculates, from the acquired position of the task #l (the problem #l), a distance between the own agent #i and each task #l (each problem #l). Then, the observation information acquisition unit 110 determines a predetermined number of neighboring tasks close to the own agent #i based on the distance between the own agent #i and each task #l (each problem #l), and incorporates information about the neighboring tasks into the observation information. In the example of the above-shown Expressions (2) to (5), the neighboring tasks are a problem #$l_1$ closest to the own agent #i and a problem #$l_2$ second closest thereto.

Further, in the Specific Example 4, the term "o_($l_1$)^task" in Expression (5) may indicate the state of the problem #$l_1$, which is the neighboring task, and the condition for finishing the problem. The state of each problem may be the position of the problem, the progress of the solution of the problem, the nature of the problem, and the type of the problem. The condition for finishing the problem may be a condition that the problem should be solved. The same applies to the term "o_($l_2$)^task".

In the Specific Example 4, similarly to the above-described embodiments, the policy storage unit 112 stores a policy $\pi$ that has already been learned through reinforcement learning (i.e., a trained model). The policy $\pi$ is learned for each agent 10. The policy $\pi_{NN,i}$ of the agent #i receives the above-described observation information $o_i$ as an input and outputs an action $a_i$ represented by the above-shown Expression (12). Further, similarly to the first embodiment, the policy $\pi_{NN,i}$ has been learned so as to maximize a reward $r_i(t)$ represented by the above-shown Expression (14).

Note that in the Specific Example 4, the term $P_l(t)$ for the achievement level of the task #l may indicate an achievement level of the solution for the problem #l at a time t. The achievement level of the solution for the problem may correspond to, for example, the completion of the handling of the problem by an agent 10 that can cope with the problem. Further, in the Specific Example 4, the term $Q_l(t)$ for the progress of the task #l may be the progress of the handling of the problem #l at the time t. The progress of the handling of the problem may correspond to, for example, the state in which the agent 10, which can cope with the problem, is coping with the problem.

Further, in the Specific Example 4, similarly to the above-described embodiments, the request response processing unit 130 calculates a request parameter $d_i$ and a response parameter $\sigma_i$ for the agent #i from the action $a_i$ that has been output from the policy $\pi_{NN,i}$ (S330). Then, the request response processing unit 130 transmits the calculated request parameter $d_i$ to the control apparatus 100 of a nearby agent(s) 10. In this process, the control apparatus 100 may transmit the request parameter to a terminal carried by a human being as in the modified example of the first and second embodiments. In this way, the human being may cope with the problem. Further, similarly to the Specific Example 1, the control apparatus 100 may transmit the request parameter to the control apparatus 100 of the agent 10 of a type different from that of the own agent #i.

Further, in the Specific Example 4, similarly to the above-described embodiments, the importance processing unit 140 updates (calculates) the importance $\varphi_i^l$ of the nearby task #l (the problem #l) for the own agent #i (S340 and S342). The importance processing unit 140 may update the importance $\varphi_i^l$ for each task #l (each problem #l) for the own agent #i by using the above-shown Expressions (23) and (24). Further, in the Specific Example 4, similarly to the above-described embodiments, the task selection unit 150 selects, based on the below-shown Expression (26), the task #l (the problem #l) of which the importance $\varphi_i^l$ is the highest among all the task #l as the task #$l_i$* to be performed by the own agent #i (S350).

Note that it is presumed that when the agent #i, which has found the problem #l, does not have a function of coping with this problem, the request level output from the policy will increase in the control apparatus 100 of that agent #i. Then, the control apparatus 100 of the agent #i transmits a request parameter equal to one ($d_i$=1) to the control apparatus 100 of a nearby agent(s) 10. Further, it is presumed that as observation information indicating the nature and type of the problem, and the above-described request parameter are acquired in, among the nearby agents 10, the control apparatus 100 of the agent 10, which can cope with the problem, the importance of the problem #l increases. Therefore, the possibility that the problem #l is selected in the control apparatus 100 of the agent 10, which can cope with the problem, and the agent 10, which can cope with the problem, will reach the position of that problem #l increases. Note that if information as to which problem has not been handled yet is added to the observation information, the agent, which has acquired the observation information, can determine, in a proactive manner, whether or not it should respond to the request for help for that problem.

Further, in the Specific Example 4, the task execution unit 160 performs control so that the own agent #i carries out the selected task #l (the problem #l) (S360). Specifically, the task execution unit 160 moves the agent #i to the position of the task #$l_i$* (the problem #$l_i$*). The task execution unit 160 controls the own agent #i so that it performs the handling of the problem that the own agent #i can perform. Then, the control apparatus 100 of each agent 10 performs processing so that all the problems concerned are solved.

Specific Example 5 of Third Embodiment

In the Specific Example 5, the method according to this embodiment is applied to handling (e.g., management) of an event. In the Specific Example 5, a flow of people in an event is controlled by a plurality of agents 10, which are machines such as robots. Specifically, the plurality of agents 10 search for a flow of people (a crowd) to be guided and guide the flow of people to a place where they should remain, and by doing so, control the flow of people (the crowd). More specifically, for example, a plurality of agents 10 hold one rope and they move to their respective positions, so that an area is partitioned into a plurality of sections by the rope. In this way, the plurality of agents 10 guide the flow of people to the partitioned areas, and thereby control the flow of people. Further, in the Specific Example 5, the control apparatus 100 of an agent 10 that has found a flow of people to be guided may transmit information about the found flow of people to the control apparatus 100 of a nearby agent(s) 10.

Note that in the Specific Example 5, the task 50 is "a bunch of people" (or simply "a flow of people"). Further, in the Specific Example 5, the target for the task 50 is to guide the flow of people to a place where they should remain. Note that as a large number of agents 10 control a flow of people, variations as to how to partition an area increase and the size of the area to be partitioned increases. The higher the number of agents 10 is, the more the possibility that the target for the task 50 will be achieved increases.

In the Specific Example 5, similarly to the above-described embodiments, the observation information acquisition unit 110 acquires observation information $o_i$ represented by Expression (5) (S310). When doing so, the observation information acquisition unit 110 calculates a distance between the own agent #i and the task #l (the flow of people #l) (S302). Specifically, similarly to the first embodiment, the observation information acquisition unit 110 acquires the position of the "flow of people", which is the task #l. The observation information acquisition unit 110 calculates, from the acquired position of the task #l (the flow of people #l), a distance between the own agent #i and each task #l (each flow of people #l). Then, the observation information acquisition unit 110 determines a predetermined number of neighboring tasks close to the own agent #i based on the distance between the own agent #i and each task #l (each flow of people #l), and incorporates information about the neighboring tasks into the observation information. In the example of the above-shown Expressions (2) to (5), the neighboring tasks are a flow of people #$l_1$ closest to the own agent #i and a flow of people #$l_2$ second closest thereto.

Further, in the Specific Example 5, the term "o_($l_1$)^task" in Expression (5) may indicate the state of the flow of people #$l_1$, which is the neighboring task, and the goal (the place where they should remain) of the flow of people #$l_1$. The state of the flow of people may be the position and speed of the flow of people. The same applies to the term "o_($l_2$)^task".

In the Specific Example 5, similarly to the above-described embodiments, the policy storage unit 112 stores a policy π that has already been learned through reinforcement learning (i.e., a trained model). The policy π is learned for each agent 10. The policy $\pi_{NN,i}$ of the agent #i receives the above-described observation information $o_i$ as an input and outputs an action $a_i$ represented by the above-shown Expression (12). Further, similarly to the first embodiment, the policy $\pi_{NN,i}$ has been learned so as to maximize a reward $r_i(t)$ represented by the above-shown Expression (14).

Note that in the Specific Example 5, the term $P_l(t)$ for the achievement level of the task #l may indicate whether the flow of people #l has reached the goal (the place where they should remain) at a time t. Further, in the Specific Example 5, the term $Q_l(t)$ for the progress of the task #l may be the moving speed of the flow of people #l to the goal at the time t.

Further, in the Specific Example 5, similarly to the above-described embodiments, the request response processing unit 130 calculates a request parameter $d_i$ and a response parameter $\sigma_i$ for the agent #i from the action $a_i$ that has been output from the policy $\pi_{NN,i}$ (S330). Then, the request response processing unit 130 transmits the calculated request parameter $d_i$ to the control apparatus 100 of a nearby agent(s) 10. In this process, the control apparatus 100 may transmit the request parameter to a terminal carried by a human being as in the modified example of the first and second embodiments. In this way, the human being may control the flow of people.

Further, in the Specific Example 5, similarly to the above-described embodiments, the importance processing unit 140 updates (calculates) the importance $\varphi_i^l$ of the nearby task #l (the flow of people #l) for the own agent #i (S340 and S342). The importance processing unit 140 may update the importance $\varphi_i^l$ for each task #l (each flow of people #l) for the own agent #i by using the above-shown Expressions (23) and (24). Further, in the Specific Example 3, similarly to the above-described embodiments, the task selection unit 150 selects, based on the below-shown Expression (26), the task #l (the flow of people #l) of which the importance $\varphi_i^l$ is the highest among all the task #l as the task #$l_i$* to be performed by the own agent #i (S350).

Further, in the Specific Example 5, the task execution unit 160 performs control so that the own agent #i carries out the selected task #l (control of the flow of people #l) (S360). Specifically, the task execution unit 160 moves the agent #i to the position of the task #$l_i$* (the flow of people #$l_i$*). The task execution unit 160 controls the own agent #i so as to control the flow of people (guide the flow of people to the place where they should remain). Then, the control apparatus 100 of each agent 10 performs processing so as to control (guide) all the flows of people.

Modified Example

Note that embodiments of the present disclosure are not limited to the above-described embodiments, and they can be modified as appropriate without departing from the scope and spirit of the disclosure. For example, the order of steps (processes) in the above-shown flowcharts can be changed as appropriate. Further, at least one of steps (processes) in the above-described flowcharts can be omitted.

Further, although it has been assumed that the agents 10 and the tasks 50 are present in a real space in the above-described embodiments, the present disclosure is not limited to such examples. The agents 10 and the tasks 50 may be present, for example, in a virtual space implemented by a simulation.

The above-described program includes instructions (or software codes) that, when loaded into a computer, cause the computer to perform one or more of the functions described in the embodiments. The program may be stored in a non-transitory computer readable medium or a tangible storage medium. By way of example, and not a limitation, the non-transitory computer readable media or tangible storage media can include a RAM (Random-Access Memory), a ROM (Read-Only Memory), a flash memory, an SSD (Solid-State Drive) or other types of memory technologies, a CD-ROM, a DVD (Digital Versatile Disc), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, the transitory computer readable media or communication media can include electrical, optical, acoustical, or other forms of propagation signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control apparatus configured to control an agent configured to perform a task of a plurality of tasks for the agent, wherein the larger a number of a plurality of agents that perform the task is, the greater a possibility that a target for the task will be achieved increases; the control apparatus comprises:

hardware, including at least one memory configured to store a computer program and at least one processor configured to execute the computer program;

a request response processing unit, implemented by the hardware, configured to calculate, based on observation information about the agent, at least one other agent, and the task, a request parameter as to whether or not to request help, and a response parameter as to whether or not to respond to a request for help from the at least one other agent;

an importance processing unit, implemented by the hardware, configured to perform processing for calculating a respective importance of each of the tasks of the plurality of tasks for the agent, based on at least the request parameter of the at least one other agent and the response parameter of the agent and a target value of the importance of the task corresponding to the observation information, the respective importance of the task corresponding to the observation information for the agent, the target value of the importance being output from each of a plurality of policies by inputting the observation information into the policy, the plurality of the policies are learned for the plurality of agents, respectively;

a task selection unit, implemented by the hardware, configured to select the task from the plurality of tasks for the agent to be performed by the agent according to the importance; and a task execution unit, implemented by the hardware, configured to control the agent by moving the agent to a position of the selected task and controlling an arm of the agent to perform the selected task in accordance with the importance, wherein when the response parameter indicates not responding to the request from the at least one other agent, the importance processing unit calculates the importance of the task corresponding to the observation information on the agent such that the importance of the task being executed by the agent asymptotically approaches the target value of the importance, and when the response parameter indicates responding to the request from the at least one other agent and the request parameter of the at least one other agent indicates requesting help, the importance processing unit calculates the importance of the task being executed by the at least one other agent corresponding to the observation information for the agent, based on a difference between the importance of the task being executed by the at least one other agent and the importance of the task for the agent, such that the importance of the task being executed by the at least one other agent is increased.

2. The control apparatus according to claim 1, wherein the request response processing unit calculates the request parameter and the response parameter based on a respective one of the plurality of policies.

3. The control apparatus according to claim 2, wherein the request response processing unit calculates the request parameter and the response parameter based on a request level and a response level, respectively, the request level and the response level being output from the one of the plurality of policies by inputting the observation information into the one of the plurality of policies.

4. The control apparatus according to claim 3, wherein the request response processing unit calculates the request parameter indicating that the help should be requested when the request level exceeds a predetermined threshold and the task that the agent is performing or about to perform is not proceeding.

5. The control apparatus according to claim 3, wherein the request response processing unit calculates the response parameter indicating that the request should be responded to when the response level exceeds a predetermined threshold and the task that the agent is performing or about to perform is not proceeding.

6. A control system configured to control a plurality of agents in a distributed manner, each of the plurality of agents being configured to perform a task of a plurality of tasks for the agent, wherein the larger a number of agents that perform the task is, the greater a possibility that a target for the task will be achieved increases; the control system comprises:

a plurality of control apparatuses, each of the plurality of control apparatuses being configured to control a respective one of the plurality of agents, and each of the plurality of control apparatuses comprises:

hardware, including at least one memory configured to store a computer program and at least one processor configured to execute the computer program;

a request response processing unit, implemented by the hardware, configured to calculate, based on observation information about the agent controlled by that control apparatus, at least one other agent, and the task, a request parameter as to whether or not to request help, and a response parameter as to whether or not to respond to a request for help from the at least one other agent;

an importance processing unit, implemented by the hardware, configured to perform processing for calculating a respective importance of each of the tasks of the plurality of tasks for the agent, based on at least the request parameter of the at least one other agent and the response parameter of the agent and a target value of the importance of the task corresponding to the observation information, the respective importance of the task corresponding to the observation information for the agent. the target value of the importance being output from each of a plurality of policies by inputting the observation information into the policy, the plurality of the policies are learned for the plurality of agents, respectively;

a task selection unit, implemented by the hardware, configured to select the task from the plurality of tasks for the agent to be performed by the agent according to the importance; and a task execution unit, implemented by the hardware, configured to control the agent by moving the agent to a position of the selected task and controlling an arm of the agent to perform the selected task in accordance with the importance, wherein when the response parameter indicates not responding to the request from the at least one other agent, the importance processing unit calculates the importance of the task corresponding to the observation information on the agent such that the importance of the task being executed by the agent asymptotically approaches the target value of the importance, and when the response parameter indicates responding to the request from the at least one other agent and the request parameter of the at least one other agent indicates requesting help, the importance processing unit calculates the importance of the task being executed by the at least one other agent corresponding to the observation information for the agent, based on a difference between the importance of the task being executed by the at least one other agent and the importance of the task for the agent, such that the importance of the task being executed by the at least one other agent is increased.

7. A control method for controlling an agent configured to perform a task of a plurality of tasks for the agent, wherein the larger a number of a plurality of agents that perform the task is, the greater a possibility that a target for the task will be achieved increases; the control method comprises:

calculating, based on observation information about the agent, at least one other agent, and the task, a request parameter as to whether or not to request help, and a response parameter as to whether or not to respond to a request for help from the at least one other agent;

performing processing for calculating a respective importance of each of the tasks of the plurality of tasks for the agent, based on at least the request parameter of the at least one other agent and the response parameter of the agent and a target value of the importance of the task corresponding to the observation information. the respective importance of the task corresponding to the observation information for the agent. the target value of the importance being output from each of a plurality of policies by inputting the observation information into the policy, the plurality of the policies are learned for the plurality of agents, respectively;

selecting the task from the plurality of tasks for the agent to be performed by the agent according to the importance;

controlling the agent by moving the agent to a position of the selected task and controlling an arm of the agent to perform the selected task in accordance with the importance; and responsive to determining that the response parameter indicates not responding to the request from the at least one other agent, calculating the importance of the task corresponding to the observation information on the agent such that the importance of the task being executed by the agent asymptotically approaches the target value of the importance.

* * * * *